(12) United States Patent
Österlund

(10) Patent No.: US 12,505,038 B1
(45) Date of Patent: Dec. 23, 2025

(54) LOADING ELEMENTS IN A COMPUTING ENVIRONMENT

(71) Applicant: Oracle International Corporation, Redwood Shores, CA (US)

(72) Inventor: Erik Österlund, Vasterhaninge (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/819,837

(22) Filed: Aug. 29, 2024

(51) Int. Cl.
*G06F 12/02* (2006.01)
*G06F 12/0802* (2016.01)

(52) U.S. Cl.
CPC ...... *G06F 12/0253* (2013.01); *G06F 12/0802* (2013.01); *G06F 2212/702* (2013.01)

(58) Field of Classification Search
CPC ............. G06F 12/0253; G06F 12/0802; G06F 2212/702
See application file for complete search history.

(56) References Cited

U.S. PATENT DOCUMENTS

| 6,438,559 | B1 | 8/2002 | Graham et al. |
| 11,934,422 | B2 | 3/2024 | Slesarenko et al. |
| 2003/0005020 | A1 | 1/2003 | Wallman et al. |
| 2009/0293048 | A1* | 11/2009 | Chen ................. G06F 8/433 717/151 |
| 2020/0183696 | A1* | 6/2020 | Williams ............. G06F 12/0811 |
| 2021/0303461 | A1* | 9/2021 | Micic ................. G06F 12/0802 |
| 2022/0156194 | A1* | 5/2022 | Williams ............. G06F 9/30043 |
| 2022/0398192 | A1* | 12/2022 | Bianco ................ G06F 12/0253 |
| 2022/0414009 | A1* | 12/2022 | Seningen ............ G06F 12/1027 |
| 2024/0054080 | A1* | 2/2024 | LeMay ................ G06F 12/1466 |

FOREIGN PATENT DOCUMENTS

| CN | 105335156 A | 2/2016 |
| CN | 116301666 A | 6/2023 |

OTHER PUBLICATIONS

"Analyze objects in the JVM heap", Retrieved from https://www.jetbrains.com/help/idea/analyze-objects-in-the-jvm-heap.html, Apr. 16, 2024, pp. 1-5.

"Persistent Reusable Java Virtual Machine User's Guide", Chapter 3. Using class loaders, Version 1, Release 4, Sep. 2003, 16 Pages.

(Continued)

*Primary Examiner* — Huawen A Peng
(74) *Attorney, Agent, or Firm* — Invoke

(57) ABSTRACT

A system determines a trigger for loading a set of elements on a background data area. In response to determining the trigger for loading the set of elements on the background data area, the system executes a first thread to load the set of elements on the background data area. The first thread accesses a set of element identifiers that identify the set of elements arranged in a sequence corresponding to a traversal of the set of elements to transitive closure. Based on the set of element identifiers, the first thread accesses a dataset that includes data for loading the set of elements and loads the set of elements on the background data area in the sequence corresponding to the traversal of the set of elements to transitive closure. A second thread maps the set of elements from the background data area to a runtime data area.

26 Claims, 15 Drawing Sheets

(56) References Cited

OTHER PUBLICATIONS

Karlsson, "JEP 439: Generational ZGC", Oct. 26, 2023, 7 Pages.
Lam, "CDS Archived Heap Improvements", Nov. 12, 2020, 2 Pages.
Lam, "How CDS Copies Class Metadata into the Archive", Aug. 10, 2020, 3 Pages.
Lam, "JEP 310: Application Class-Data Sharing", Aug. 24, 2023, 3 Pages.
Liden et al., "JEP 333: ZGC: A Scalable Low-Latency Garbage Collector(Experimental)", Mar. 13, 2020, 3 Pages.
Liden, "JEP 377: ZGC: A Scalable Low-Latency Garbage Collector(Production)", Mar. 6, 2023, 2 Pages.
Osterlund E., "CDS Object Streaming", Feb. 16, 2024, 6 Pages.
Pantsyr, "Classloaders in JVM: An Overview", Retrieved from https://dzone.com/articles/classloaders-in-jvm-an-overview, May 10, 2023, 6 Pages.

\* cited by examiner

LOADING ELEMENTS IN A COMPUTING ENVIRONMENT

TECHNICAL FIELD

The present disclosure relates to loading elements in a computing environment such as an object-oriented computing environment. More particularly, the present disclosure relates to loading elements to initialize a virtual machine and/or loading elements that are executed by a virtual machine. Additionally, the present disclosure relates to garbage collection processes for managing memory of a computing environment such as an object-oriented computing environment.

BACKGROUND

Computing systems, such as object-oriented computing systems, load elements on a runtime data area through a process that involves accessing source files from a source data area, allocating memory blocks of the runtime data area for the elements, and instantiating the elements on the memory blocks. Some object-oriented computing systems utilize shared data loading techniques among multiple instances of a computing system. The shared data loading techniques involve storing frequently utilized class data in a shared archive and mapping the class data to runtime data areas of the multiple instances of the computing system. One example of a shared data loading technique is Class Data Sharing (CDS). The shared data loading techniques allow for faster class loading and a reduced memory footprint among the multiple instances of the computing system.

Computing systems, such as object-oriented computing systems, utilize garbage collection (GC) processes to manage memory in a runtime environment of the computing system. The GC processes identify and reclaim memory that is no longer in use in the runtime environment. The GC processes involve tracking references to elements that have been allocated in the runtime data area and reclaiming memory blocks that are allocated for elements that are no longer reachable in the runtime data area. The GC processes prevent memory leaks and ensure that the computing system has sufficient free memory to allocate new elements as needed.

Some GC processes are not compatible with existing shared data loading techniques such as CDS. Examples of GC processes that are not compatible with existing shared data loading techniques, such as CDS, include Z-Garbage Collector (ZGC), Shenandoah GC, and certain configurations of Garbage-First Garbage Collector (G1 GC). In one example, the incompatibility between a GC process and existing shared data loading techniques, such as CDS, arises where the GC process dynamically modifies references and memory layouts in the runtime environment. Existing shared data loading techniques, such as CDS, utilize a static memory layout that relies on memory mapping being consistent throughout runtime. Elements in the shared archive are mapped to the runtime data area using static references that would not be modified by existing GC processes for dynamically modifying references and memory layouts in the runtime environment. Additionally, existing shared data loading techniques, such as CDS, require memory addresses to be consistent across instances to ensure proper sharing of elements in the shared archive.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
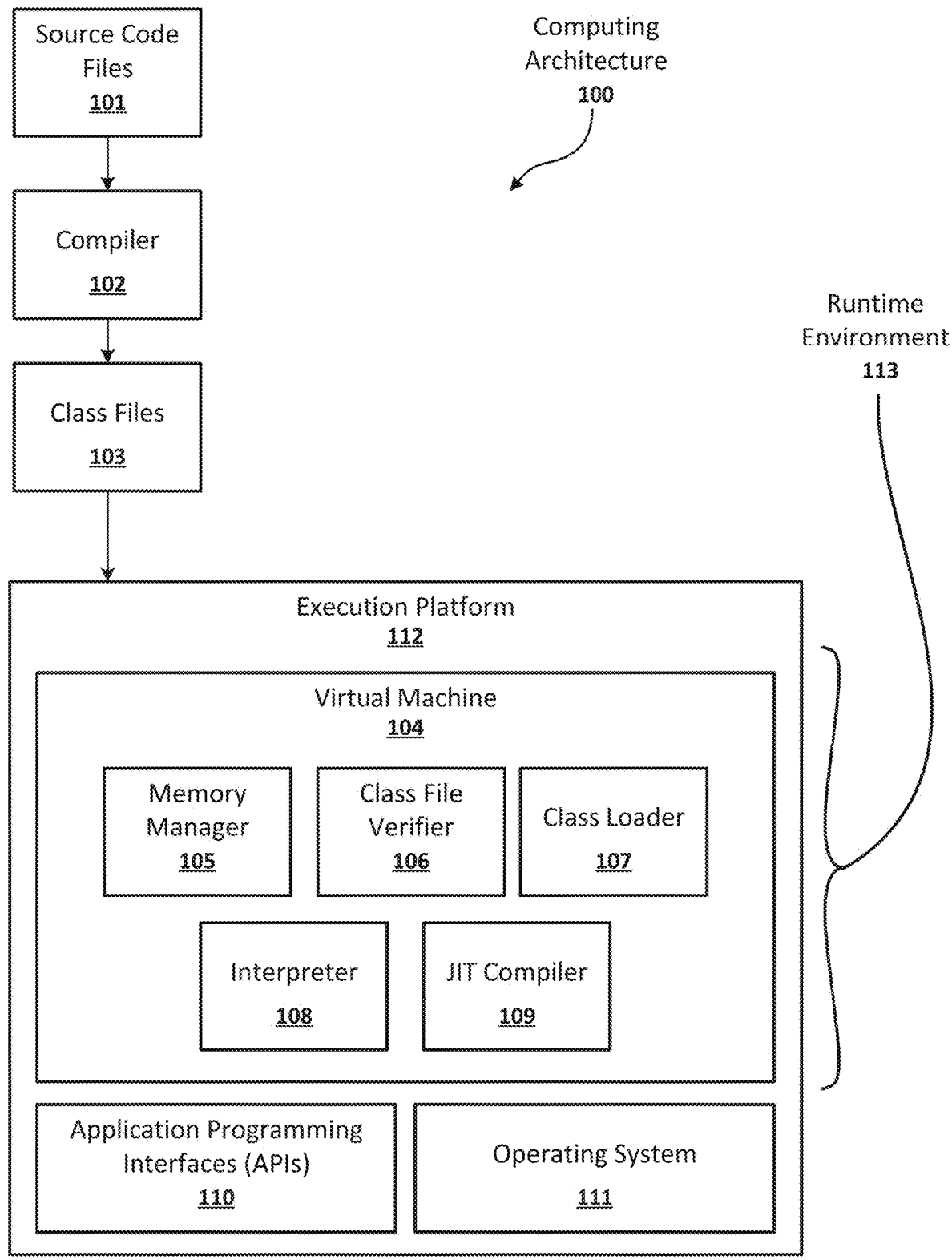
FIG. 1 is a block diagram that depicts an example computing architecture for implementing features described herein in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. ARCHITECTURAL OVERVIEW
    3.1 EXAMPLE CLASS FILE STRUCTURE
    3.2 EXAMPLE VIRTUAL MACHINE ARCHITECTURE
    3.3 LOADING, LINKING, AND INITIALIZING
3. DEFINITIONS
4. EXAMPLE COMPUTING SYSTEM FOR LOADING ELEMENTS IN A COMPUTING ENVIRONMENT
5. EXAMPLE OPERATIONS PERTAINING TO LOADING ELEMENTS IN A COMPUTING ENVIRONMENT
    5.1. EXECUTING BACKGROUND DATA THREADS TO LOAD ELEMENTS ON A BACKGROUND DATA AREA
    5.2. EXECUTING RUNTIME DATA THREADS TO LOAD ELEMENTS ON A RUNTIME DATA AREA
6. EXAMPLE OPERATIONS PERTAINING TO COMMENCING EXECUTION OF A GARBAGE COLLECTION PROCESS
7. EXAMPLE OPERATIONS PERTAINING TO INITIALIZING A VIRTUAL MACHINE
8. HARDWARE OVERVIEW
9. MISCELLANEOUS; EXTENSIONS

1. General Overview

A system loads elements on a background data area according to a pre-arranged sequence of elements corresponding to a traversal of the elements to transitive closure. The system accesses a set of element identifiers that identify the set of elements arranged in the pre-arranged sequence. Based on the set of element identifiers, the system accesses a dataset for loading the set of elements and loads the set of elements on the background data area in the pre-arranged sequence. The elements are loaded on the background data area by one or more background data threads. The background data area is accessible by one or more runtime data threads that map elements from the background data area to a runtime data area. In one example, a background data thread loads a set of elements on the background data area concurrently while a runtime data thread loads the set of elements on the runtime data area. The background data thread loads a first subset of elements of the first set of elements on the background data area concurrently, while the runtime data thread loads a second subset of elements of the first set of elements on the runtime data area.

In one example, one or more background data threads do a bulk of the work by loading the set of elements to the background data area. The one or more runtime data threads map elements from the background data area to the runtime data area "lazily," meaning that the one or more runtime data threads map elements from the background data area to the runtime data area when the elements are encountered during execution of the one or more runtime data threads. Additionally, or alternatively, when the one or more runtime data threads encounter elements that the one or more background data threads have not yet loaded on background data area, the one or more runtime data threads may load the elements to the runtime data area "lazily," meaning that the one or more runtime data threads load the elements to the runtime data area dynamically when the elements are encountered during execution.

The background data thread propagates a lock that represents a range of elements that the background data thread is currently loading on the background data area. The lock prevents the runtime data thread from accessing the range of elements that the background data thread is currently loading on the background data area. The background data thread loads elements on the background data area in the pre-arranged sequence of elements corresponding to the traversal of the elements to transitive closure. As elements are loaded on the background data area, the background data thread releases the lock from elements that are loaded on the background data area and applies the lock to additional elements to be loaded on the background data area in accordance with the pre-arranged sequence.

The runtime data thread loads elements on the runtime data area by mapping elements from the background data area to the runtime data area that the background data thread has loaded on the background data area. Additionally, or alternatively, the runtime data thread dynamically loads elements on the runtime data area, for example, when the elements have not yet been loaded on the background data area. In one example, the runtime data thread determines whether a subset of elements have been loaded on the background data area. When the runtime data thread determines that the subset of elements have been loaded on the background data area, the runtime data thread maps the subset of elements from the background data area to the runtime data area. When the runtime data thread determines that the subset of elements have not yet been loaded on the background data area, the runtime data thread dynamically loads elements on the runtime data area. If the subset of elements is subject to a lock, indicating that a background data thread is currently loading the subset of elements on the background data area, the runtime data thread waits for the subset of elements to be released from the lock. The subset of elements are released from the lock after having been loaded on the background data area. When the subset of elements is released from the lock, the runtime data thread maps the subset of elements from the background data area to the runtime data area.

The elements are loaded on the background data area according to a pre-arranged sequence of elements corresponding to a traversal of the elements to transitive closure. The traversal is performed by a traversal algorithm that achieves transitive closure. The sequential arrangement of elements according to the traversal to transitive closure allows the system to reference and link elements during the loading process. Additionally, the sequential arrangement of elements according to the traversal to transitive closure allows GC processes to dynamically modify references and memory layout in the runtime data area while preserving the integrity of references to elements loaded on the background data area that are mapped to the runtime data area. The pre-arranged sequence of elements is encoded as element indices. The element indices are index numbers that represent the order of occurrence of the elements in the pre-arranged sequence. The element indices are mapped to the locations of the elements.

In one example, the system generates a reference table that includes the element indices that identifies elements arranged in the pre-arranged sequence. The system may utilize the reference table to manage operations pertaining to loading elements on the background data area and/or the runtime data area. For example, the system may identify elements based on element indices, and upon having identified element indices, the system may determine locations of elements based on references that are mapped to the element indices. Additionally, or alternatively, the system may update the references in the reference table as elements are loaded, mapped, and/or relocated in the background data area and/or the runtime data area.

In one example, the locations of the elements are represented by references that conform to a reference configuration for a particular GC process. The system may select the particular GC process from a set of GC processes that utilize different reference configurations relative to one another. The configuration of references for different GC processes can vary significantly depending on the GC process. The system may select the GC process after elements have already been loaded in the runtime environment. Additionally, or alternatively, prior to commencing a GC process, the locations of the elements may be represented by references to memory addresses, such as explicit addresses or offsets from a base address. The use of memory addresses facilitates faster execution of operations for loading and mapping elements.

When the system determines a trigger for commencing a selected GC process, the system determines a reference configuration for the GC process and maps the element indices to references that conform to the reference configuration for the GC process. In one example, the system replaces the references to the memory addresses with references that conform to the reference configuration for the GC process. The references that conform to the reference configuration for the GC process point to the locations of the elements through a layer of abstraction provided by the runtime environment for use by the GC process in memory management operations. The system maps the element indices to references that conform to the reference configuration for the GC process for elements that have been loaded on the background data area. Additionally, once the GC process commences, the system utilizes the reference configuration for the GC process instead of the memory addresses. Thus, because the elements have references that conform to the reference configuration for the GC process, GC processes that dynamically modify references and memory layouts in the runtime environment can be utilized in conjunction with elements that are loaded on the background data area and mapped to the runtime data area.

In one example, the system executes an iterative traversal process to load elements on the background data area. To execute the iterative traversal process, the system allocates memory of the background data area for a comprehensive set of elements that are directly or indirectly reachable from a root that represents an entry point to the set of elements. After the system allocates memory for the comprehensive set of elements, the system initializes the set of elements and generates references that define links between elements that are linked to one another. The iterative traversal process allows the system to determine locations of objects that are linked to one another when initializing and linking the objects.

In one example, the system executes an initialization process for initializing a virtual machine that includes loading elements on the background data area in accordance with a pre-arranged sequence of elements corresponding to a traversal of the elements to transitive closure. The elements in the pre-arranged sequence may represent an entirety of elements or a subset of elements that are loaded when initializing a virtual machine. In one example, the system generates a reference table that includes a set of element identifiers, such as element indices, that identify a set of elements for initializing the virtual machine arranged according to the pre-arranged sequence. Upon having generated the reference table, the system initializes a background data area and a runtime data area for loading elements for initializing the virtual machine. Upon having initialized the background data area, the system commences loading elements on the background data area in accordance with the pre-arranged sequence. Additionally, upon having initialized the runtime data area, the system commences loading elements on the runtime data area, for example, by mapping elements from the background data area to the runtime data area and/or by dynamically loading elements on the runtime data area that have not yet been loaded on the background data area. The system may load elements on the runtime data area "lazily," meaning that the system loads the elements when the elements are encountered during initialization of the virtual machine.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, etc. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, etc. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation at runtime. Furthermore, since various instructions are analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting instructions individually. There are several variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, etc.).

The following discussion assumes that the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, etc. Further, some classes (or fields/methods within those classes) may include access restrictions that limit their use to within a particular class/library/package or to classes with appropriate permissions.

2.1 Example Class File Structure

Figure 2:
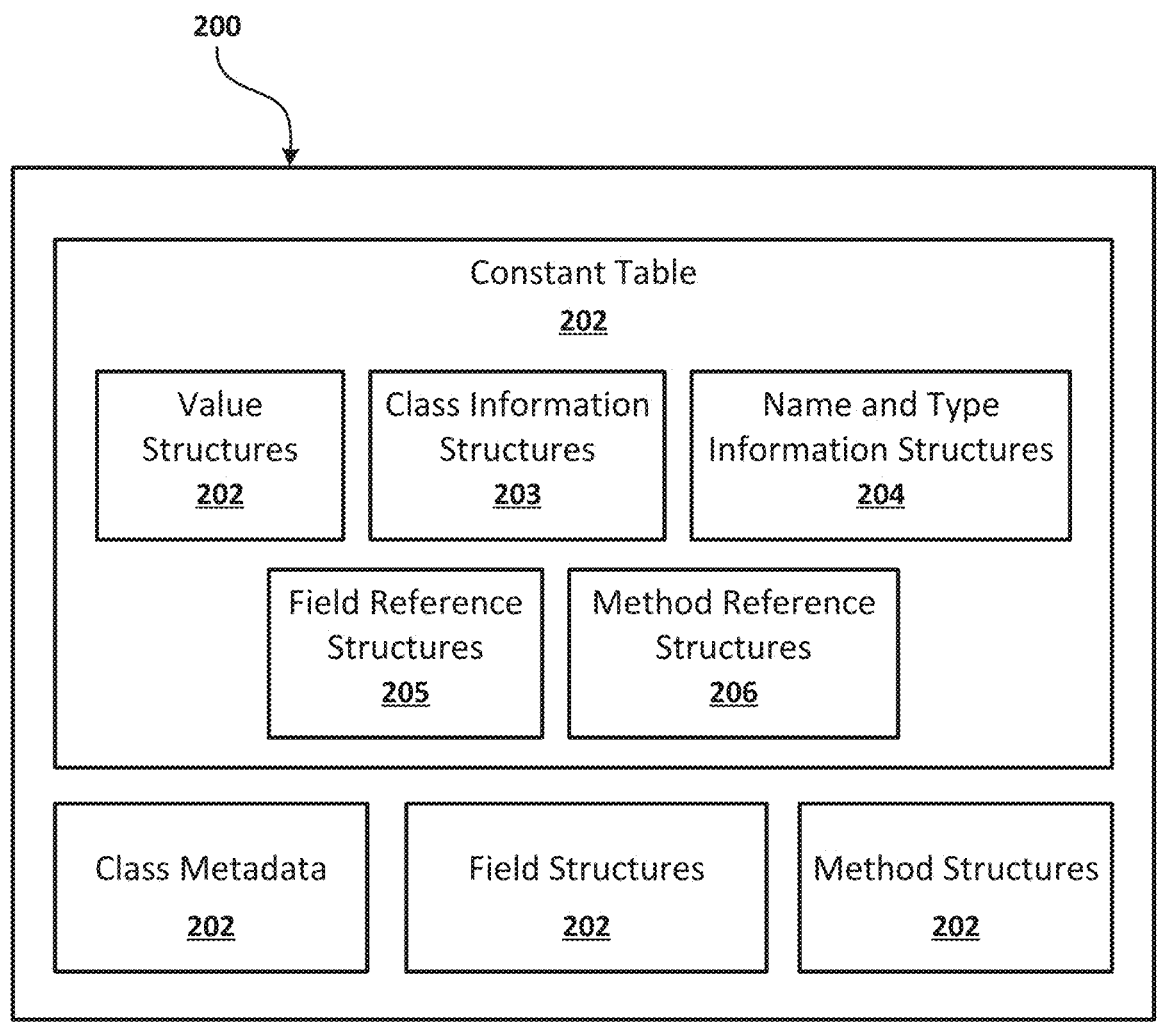
FIG. 2 is a block diagram that depicts an example computer system for implementing features described herein in accordance with one or more embodiments.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, class metadata 207, field structures 208, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, etc.), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (if the class is public, private, final, abstract, etc.), an index to one of the class information structures 203 of the constant table 201 that identifies the present class, an index to one of the class information structures 203 of the constant table 201 that identifies the superclass (if any), etc.

In an embodiment, the field structures 208 represent a set of structures that identifies the various fields of the class. The field structures 208 store, for a field of the class, accessor flags for the field (if the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for a method of the class, accessor flags for the method (e.g. if the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where an index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

class A
{
int add12and13 ( ) {
    return B.addTwo (12, 13);
}
}

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I) I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
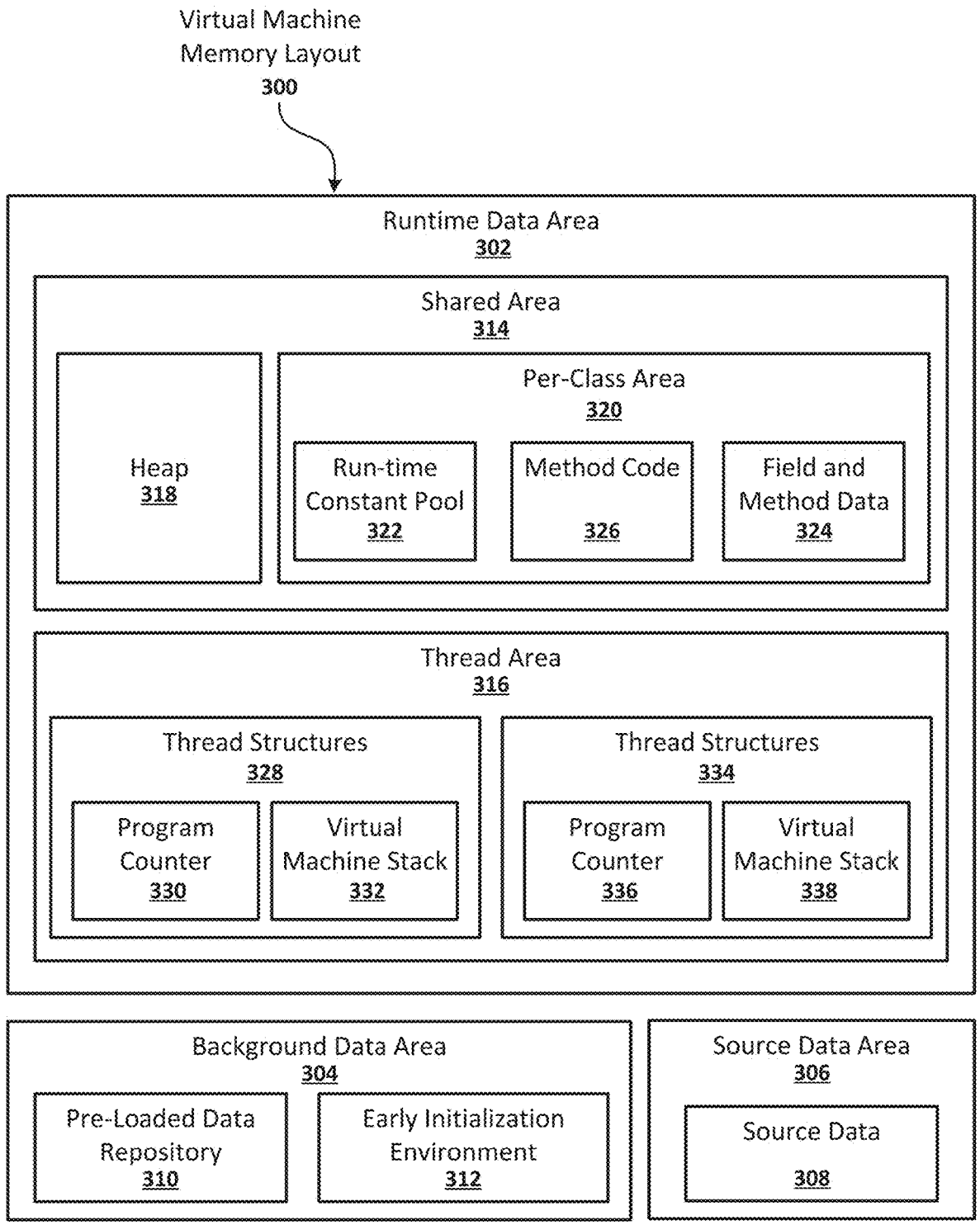
FIG. 3 is a block diagram that depicts an example virtual machine memory layout according to one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 includes a runtime data area 302, a background data area 304, and a source data area 306. The runtime data area 302 stores data structures associated with execution of the runtime environment 113 (FIG. 1). Elements that are utilized for operations executed in the runtime environment are loaded in the runtime data area 302. The background data area 304 includes data structures that are loaded in the background, for example, to reduce startup time and memory footprint of the virtual machine 104 and applications executed by the virtual machine 104. Elements that are loaded in the background data area 304 can be mapped to the runtime data area 302, for example, for use in operations executed in the runtime environment 113 (FIG. 1). The source data area 306 includes source data 308 for loading elements on the background data area 304 and/or on the runtime data area 302. The source data 308 may include source code files 101 (FIG. 1).

The background data area 304 includes a pre-loaded data repository 310. Elements that are loaded on the background data area 304 that can be mapped to the runtime data area 302 may be located in the pre-loaded data repository 310. In one example, the pre-loaded data repository 310 includes class files 200 (FIG. 2). The pre-loaded data repository 310 may include precompiled bytecode of elements that can be mapped to the background data area 304. Additionally, or alternatively, the pre-loaded data repository 310 may include element metadata, constant pools, symbols, strings, and other data that can be mapped to the runtime data area 302. In one example, the pre-loaded data repository 310 is a class data-sharing archive.

In one example, the background data area 304 includes an early initialization environment 312. When initializing a virtual machine 104 (FIG. 1), the operating system 111 (FIG. 1) utilizes the early initialization environment 312 as a controlled space where fundamental components and subsystems are set up before the virtual machine 104 fully transitions to its operational state. The early initialization environment 312 may include a bootstrap area where fundamental components are loaded and initialized. The early initialization environment 312 may include memory segments reserved for the early initialization process, such as initial heap allocation, stack setup, and/or class metadata storage. The early initialization environment 312 may include paths and locations where core libraries and resources are stored. The early initialization environment 312 may include initial data structures, such as those for memory management, thread management, and/or security.

The runtime data area 302 includes a shared area 314 and a thread area 316. The shared area 314 represents an area in memory where structures shared among the various threads executing on the virtual machine 104 are stored. The shared area 314 includes a heap 318 and a per-class area 320. In an embodiment, the heap 318 represents the run-time data area from which memory for class instances and arrays is allocated. In an embodiment, the per-class area 320 represents the memory area where the data pertaining to the individual classes are stored. In an embodiment, the per-class area 320 includes, for a loaded class, a run-time constant pool 322 representing data from the constant table 201 of the class, field and method data 324 (for example, to hold the static fields of the class), and the method code 326 representing the virtual machine instructions for methods of the class.

The thread area 316 represents a memory area where structures specific to individual threads are stored. In FIG. 3, the thread area 316 includes thread structures 328 and thread structures 334, representing the per-thread structures utilized by different threads. In order to provide clear examples, the thread area 316 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 328 includes program counter 330 and virtual machine stack 332. Similarly, thread structures 334 includes program counter 336 and virtual machine stack 338. In an embodiment, program counter 330 and program counter 336 store the current address of the virtual machine instruction being executed by their respective threads.

Thus, as a thread steps through the instructions, the program counters are updated to maintain an index to the current instruction. In an embodiment, virtual machine stack 332 and virtual machine stack 338 store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
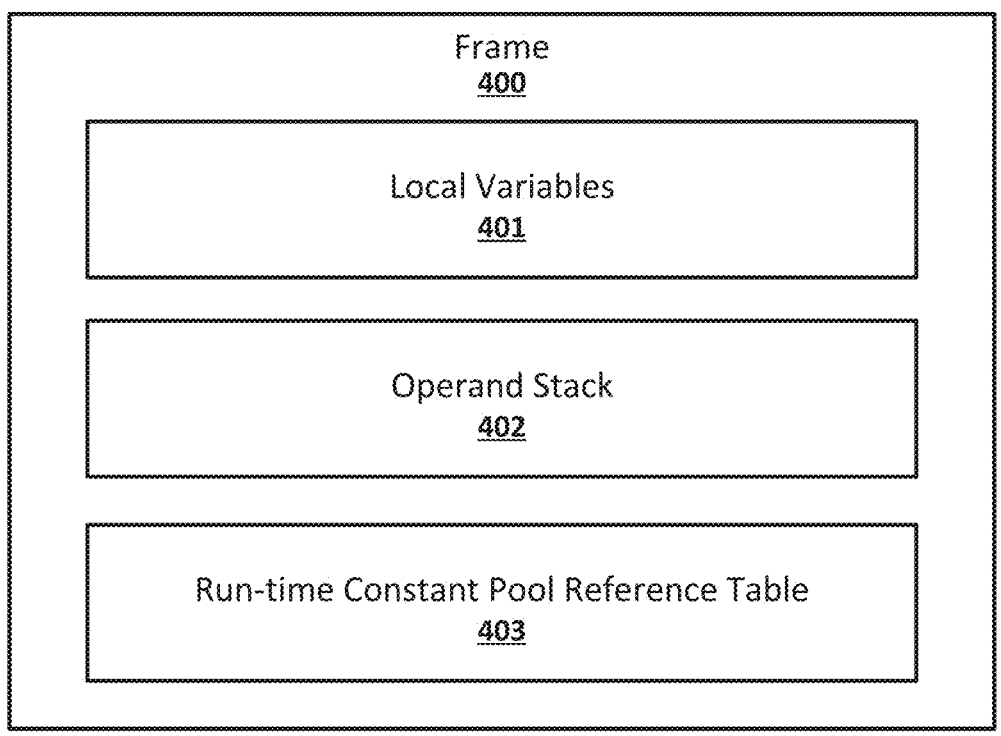
FIG. 4 is a block diagram that depicts an example frame according to one or more embodiments.

FIG. 4 illustrates an example frame 400 in block diagram form according to an embodiment. In order to provide clear examples, the remaining discussion will assume that frames of virtual machine stack 332 and virtual machine stack 338 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, when the frame 400 is created by the virtual machine 104, the operand stack 402 is empty by default. The virtual machine 104 then supplies instructions from the method code 326 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 322 of the current class. The run-time constant pool reference table 403 is used to support resolution. Resolution is the process whereby symbolic references in the run-time constant pool 322 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the representation from the associated class file 200 may include creating the run-time constant pool 322, method code 326, and field and method data 324 for the class within the per-class area 320 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 324 of the class and/or create class instances on the heap 318 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, etc. Thus, progress through the stages of loading, linking, and initializing can differ from class to class. Furthermore, some embodiments may delay (perform "lazily") one or more functions of the loading, linking, and initializing process until the class is required. For example, resolution of a method reference may be delayed until a virtual machine instruction invoking the method is executed. Thus, the exact timing of when the steps are performed for each class can vary greatly between implementations.

To begin the loading process, the virtual machine 104 invokes the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines if the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 322, method code 326, and field and method data 324 for the class within the per-class area 320.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and resolves the symbolic references defined in the run-time constant pool 322 of the class.

To verify the class, the virtual machine 104 checks if the in-memory representation of the class is structurally correct. For example, the virtual machine 104 may check that each class except the generic class Object has a superclass, check that final classes have no sub-classes and final methods are not overridden, check if constant pool entries are consistent with one another, check if the current class has correct access permissions for classes/fields/structures referenced in the run-time constant pool 322, check that the virtual machine 104 code of methods will not cause unexpected behavior (e.g. making sure a jump instruction does not send the virtual machine 104 beyond the end of the method), etc. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 324 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 322 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 320 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 324 for the class and generate/initialize any class instances on the heap 318 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking if the field/method is defined in the referenced class. Otherwise, the virtual machine 104 recursively searches through the super-classes of the referenced class for the referenced field/method until the field/method is located, or the top-level superclass is reached, in which case an error is generated.

3. Definitions

As used herein, the term "transitive closure," as used with respect to a traversal of elements to transitive closure, refers to a state of having identified a comprehensive set of elements that are directly or indirectly reachable from at least one starting element. The starting element may be a root that represents an entry point to a set of elements. The set of elements may include multiple roots that represent an entry point for a set of elements corresponding to a particular root. A root may include one or more of the following: a system class, an application class, or an extension class. The elements that are reachable from an entry point may include one or more of the following: objects, references, metadata, or subclasses.

As used herein, the term "traversal to transitive closure" refers to a process of identifying a comprehensive set of elements that are directly or indirectly reachable from a starting element.

As used herein, the term "runtime environment" refers to an execution platform that supports the execution of applications. Additionally, the runtime environment may include a set of resources and services utilized by the execution platform to manage execution of the applications.

As used herein, the term "element" refers to a distinct unit of code or data that is loaded, utilized, or managed during execution of a program, for example, in connection with the creation, management, and execution of computing environments and/or software applications that are executed within a computing environment. Elements may include one or more of the following: classes, objects, methods, fields, interfaces, packages, modules, resources, roots, threads, exceptions, libraries, or configurations.

4. Example Computing System for Loading Elements in a Computing Environment

Figure 5A:
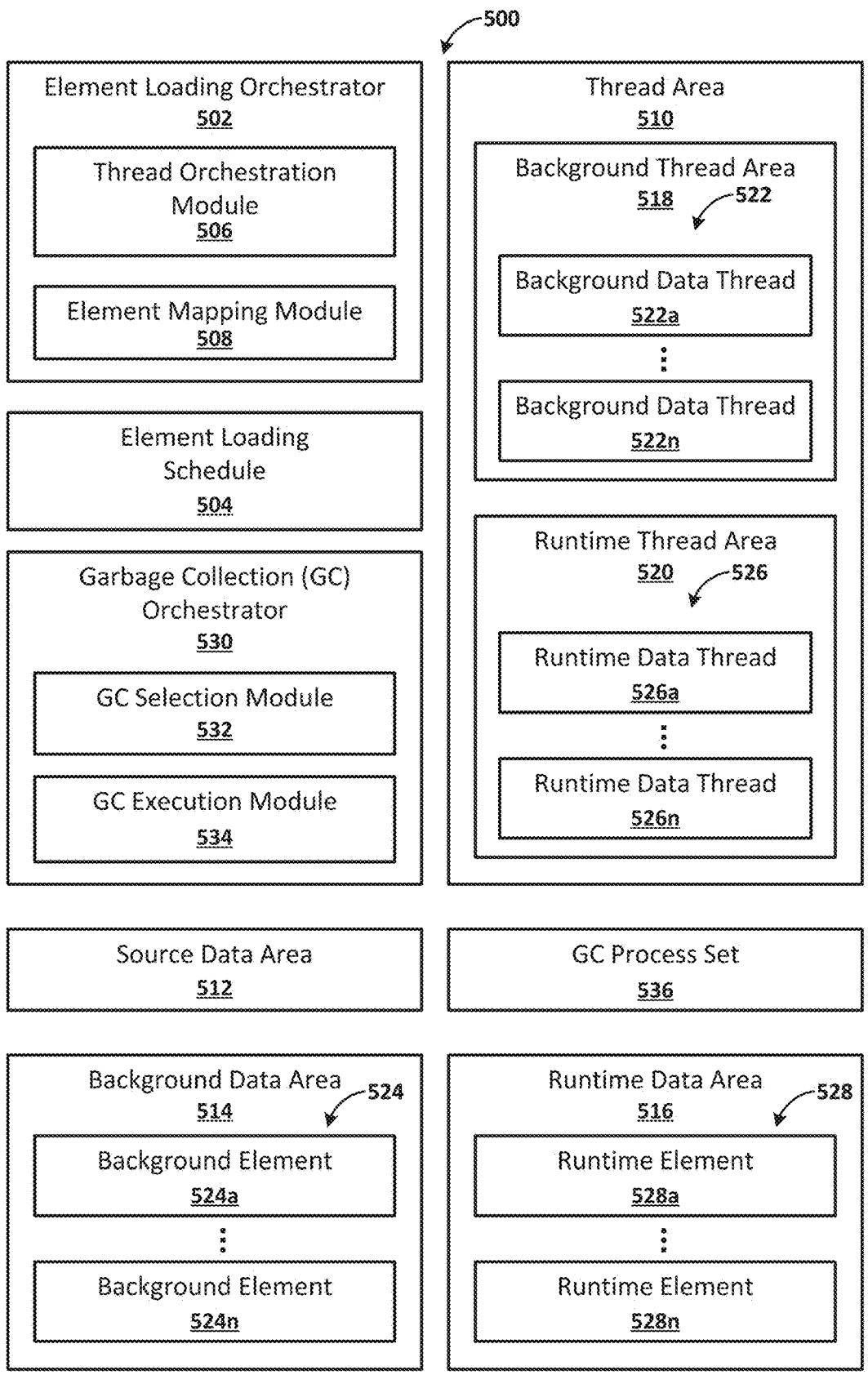
FIG. 5A is a block diagram that depicts further example features of a computing system for loading elements in a computing environment according to one or more embodiments.
Figure 5B:
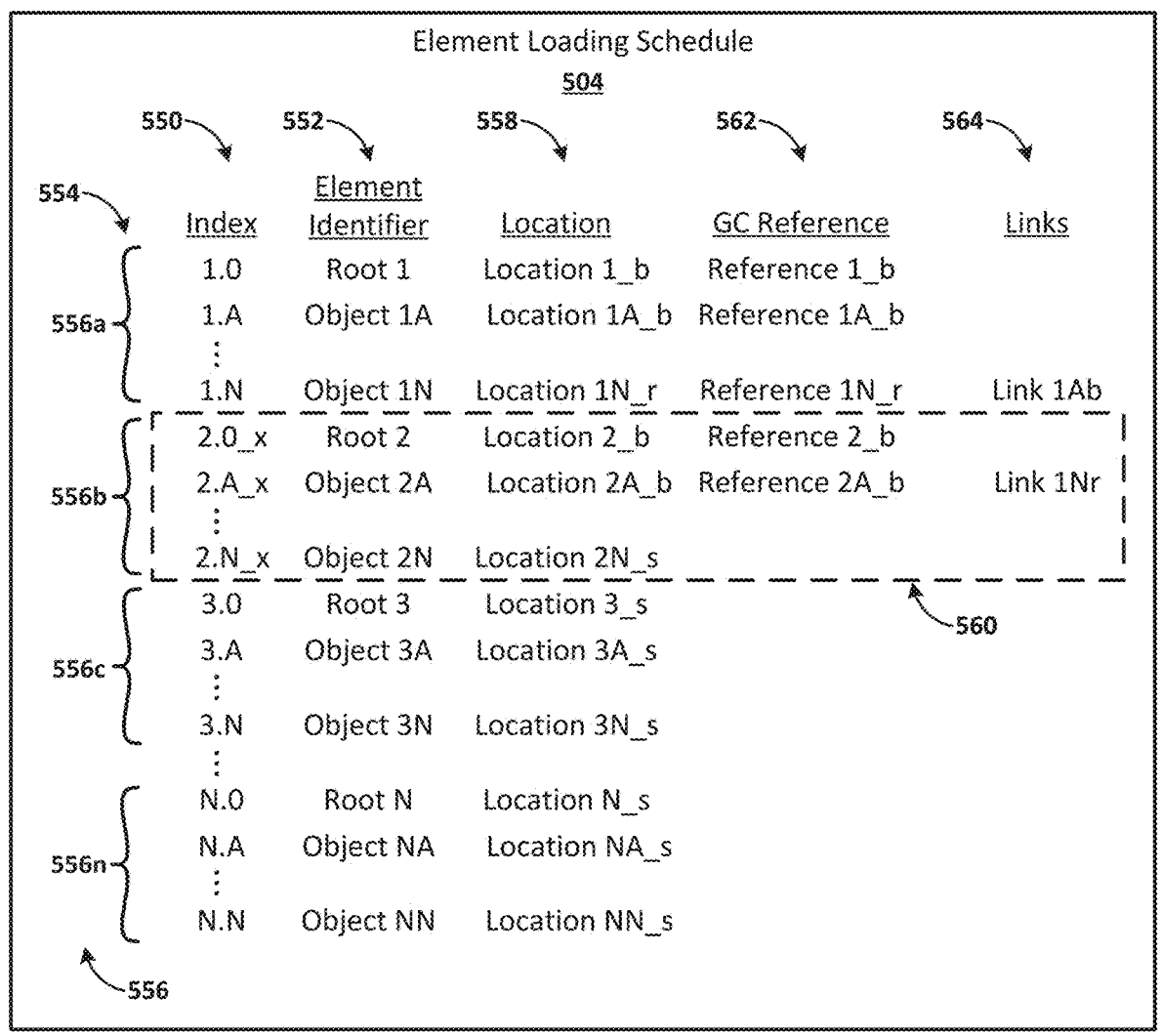
FIG. 5B is a table that depicts an example set of elements that may be loaded on a computing system according to one or more embodiments.

Referring now to FIGS. 5A and 5B, features of an example computing system 500 are further described in accordance with one or more embodiments. In one or more embodiments, the system 500 refers to hardware and/or software configured to perform operations described herein. The computing system 500 executes operations pertaining to loading elements in a computing environment. In one example, the operations include initializing a virtual machine. In one example, the operations include executing an application on the virtual machine. Additionally, or alternatively, the operations include commencing execution of a GC process and/or executing the GC process to perform memory management operations associated with the computing environment. Example operations are described below with reference to FIGS. 6A-6E, FIGS. 7A and 7B, and FIG. 8. In one example, the system described with reference to FIGS. 5A and 5B may include one or more features described above in Section 3, titled "Architectural Overview."

In one or more embodiments, the system 500 may include more or fewer components than the components described with reference to FIGS. 5A and 5B. The components described with reference to FIGS. 5A and 5B may be local to or remote from each other. The components described with reference to FIGS. 5A and 5B may be implemented in software and/or hardware. The components of system 500 may be distributed over multiple applications and/or machines. Multiple components may be combined into one application and/or machine. Operations described with respect to one component may instead be performed by another component.

As shown in FIG. 5A, the system 500 includes an element loading orchestrator 502 and an element loading schedule 504. The element loading orchestrator 502 orchestrates operations pertaining to loading elements in the computing environment in accordance with the element loading schedule 504. In one example, the element loading orchestrator includes a thread orchestration module 506 and an element mapping module 508. The thread orchestration module 506 orchestrates execution of threads that load elements in the computing environment in accordance with the element loading schedule 504. The element mapping module 508 executes operations pertaining to generating element loading schedules 504. To generate the element loading schedule 504, the system may traverse an element graph to transitive closure to identify a set of elements. Upon identifying the set of elements, the system may add element identifiers to the element loading schedule 504 that identify the elements in the sequence corresponding to the traversal of the element graph to transitive closure. The element mapping module 508 may generate an element loading schedule 504 prior to orchestration by the thread orchestration module 506 of the threads that load elements in the computing environment. Features of an example element loading schedule 504 are further described below with reference to FIG. 5B.

The element mapping module 508 identifies elements that can be loaded in the computing environment by executing a traversal algorithm that traverses elements to transitive closure. The element mapping module 508 arranges the elements in the element loading schedule sequentially according to the traversal to transitive closure. The traversal performed by the traversal algorithm may begin at a root that represents an entry point for a set of elements that are accessible from the root. The element mapping module 508 may identify elements that is accessible from a root. The element mapping module 508 may traverse elements for multiple roots that represent entry points for accessing one or more elements. The traversal algorithm may include one or more of the following: a depth-first search traversal algorithm, a breadth-first search traversal algorithm, a union-find traversal algorithm, a Warshall's traversal algorithm, a Tarjan's traversal algorithm, a Kosaraju traversal algorithm, or a matrix multiplication algorithm.

As further shown in FIG. 5A, the system 500 includes a thread area 510, a source data area 512, a background data area 514, and a runtime data area 516. The source data area 512, the background data area 514, and the runtime data area 516 represent separate memory regions of the system 500. The source data area 512, the background data area 514, and the runtime data area 516 may be configured as described with reference to FIG. 3. The thread orchestration module 506 orchestrates execution of threads that execute in the thread area. The thread area 510 may include a runtime thread area and a background thread area 518 and a runtime thread area 520.

A set of one or more background data threads 522, such as background data thread 522a and background data thread 522n, execute in the background thread area 518. One or more background data threads 522 load elements on the background data area 514 based on source data in the source data area 512. The one or more background data threads 522 load the elements on the background data area in a sequence that the elements are arranged in the element loading schedule 504. In one example, the background data area 514 includes a set of background elements 524, such as background element 524a and background element 524n. The background elements 524 were loaded on the background data area 514 by one or more of the background data threads 522. In one example, the background data threads 522 are class data sharing threads. In one example, the background data area is a class data sharing archive.

A set of one or more runtime data threads 526, such as runtime data thread 526a and runtime data thread 526n, execute in the runtime thread area 520. One or more runtime data threads 526 map elements from the background data area 514 to the runtime data area 516. Additionally, or alternatively, one or more runtime data threads 526 load elements from the source data area 512 to the runtime data area 516. The one or more runtime data threads 526 map and/or load elements on the runtime data area 516 in the order that the elements are encountered when executing code. In one example, the runtime data area 516 includes a set of runtime elements 528, such as runtime element 528a and runtime element 528n. The runtime elements 528 were mapped and/or loaded on the runtime data area 516 by one or more of the runtime data threads 526.

In one example, the system 500 includes a GC orchestrator 530. The GC orchestrator includes a GC selection module 532 and a GC execution module 534. The GC selection module 532 selects a GC process for execution by the GC execution module 534. The system 500 may include a GC process set 536. The GC process set 536 includes a set of GC processes that are available for selection by the GC selection module 532. In one example, the GC process set 536 includes one or more of the following: ZGC, Shenandoah GC, or G1 GC. Additionally, or alternatively, the GC process set 536 may include one or more of the following: a Serial GC, a parallel GC, or a Concurrent Mark-Sweep (CMS) GC.

The GC selection module 532 may configure references that are utilized to identify locations of elements and/or to link elements to one another based on the GC process that is selected. Additionally, or alternatively, the GC selection module 532 may update the element loading schedule 504 with references that correspond to the selected GC process. The configuration of references for GC processes can vary significantly depending on the specific GC process that is selected. Additionally, or alternatively, a GC process may utilize different types of references, such as weak, soft, or phantom references. The GC process may process the different types of references in phases, for example, to reduce effects of the GC process on threads that are executing in the runtime environment.

In one example, a GC process utilizes colored pointers that encode metadata directly in the object references. The GC process may utilize the colored pointers to track a state of the elements during the GC process. Additionally, or alternatively, a GC process may utilize load barriers that modify the behavior of reference load operation to handle object relocation and marking. One example of a GC process that utilizes colored pointers, load barriers, and different types of references is ZGC.

In one example, a GC process utilizes forward pointers, such as Brooks pointers, that may point to an element itself or to a new location after relocation of the element. Additionally, or alternatively, a GC process may utilize a combination of read and write barriers. The GC process may utilize read barriers to ensure that references to objects that are relocated are updated to the new location. The GC process may utilize write barriers to help maintain consistency during concurrent phases of the GC process. One example of a GC process that utilizes forward pointers, a combination of read and write barriers, and different types of references is Shenandoah GC.

In one example, a GC process utilizes region-based pointers. The GC process may divide a runtime data area into regions and maintain pointers to objects within these regions. Additionally, or alternatively, a GC process may utilize concurrent marking and remarking to update references to live objects across regions. One example of a GC process that utilizes region-based pointers and concurrent marking and remarking is G1 GC.

In one example, a GC process utilizes direct references without special indirection or barriers. Additionally, or alternatively, a GC process may utilize a mark-sweep-compact process, where live elements are marked, memory blocks are reclaimed for elements that were not marked, and live objects are moved to a contiguous memory area. Examples example of GC process that utilizes direct references and a mark-sweep-compact process include Serial GC, Parallel GC, and CMS GC.

In one example, a GC process utilizes a reference compression scheme. The reference compression scheme may utilize compressed ordinary object pointers (compressed oops). The reference compression scheme compresses the compressed oops to save memory and reduce cache usage. For example, in a 64-bit virtual machine, references are typically 64 bits long. However, many applications do not utilize the full 64-bit address space. Compressed oops allow the virtual machine to utilize references with a compressed bit length, such as 32-bits. The compressed bit length of 32 bits represent an offset from a base address. The offset can be multiplied by a shift factor (e.g., 8 bytes) before being added to the base address. This allows a 32-bit compressed oop to address a memory space of 32 GB (e.g., $2^{32} \times 8$ bytes=32 GB). Compressed oops rely on the pointer being stored as an offset relative to the base address.

In one example, the reference compression scheme may depend on heap size. For example, when the heap size is 32 GB or less, a 32-bit offset can address memory locations with in this range. When the heap size is greater than 32 GB, a 32-bit reference range may be insufficient to address the entire heap. To address the larger heap size, the reference compression scheme may utilize 64-bit references, or the reference compression scheme may utilize a larger shift factor.

In contrast with compressed oops, colored pointers utilized by GC processes such as ZGC typically reserve specific bits with in the pointer to store information about the status of the element referenced by the pointer. In one example, a colored pointer utilizes the uppermost bits of the available address space for color bits. For example, a colored pointer that has a 64-bit address space may utilize 4 bits as color bits, leaving 60 bits available for the memory address.

Referring to FIG. 5B, an example element loading schedule 504 is further described. The element loading schedule 504 identifies a set of elements arranged in a sequence corresponding to a traversal of the set of elements to transitive closure. The element loading schedule may include a set of indices 550 that are sequentially arranged in accordance with the traversal of the set of elements to transitive closure. The indices 550 may serve as element identifiers for the elements. Additionally, or alternatively, the element loading schedule 504 may include element identifiers 552. The indices 550 may be mapped to the element identifiers 552. The indices 550 and/or the element identifiers 552 may represent a set of elements 554 to be loaded on the background data area 514 and/or on the runtime data area 516 (FIG. 5A). The set of elements 554 includes multiple element subsets 556, such as element subset 556a, element subset 556b, element subset 556c, and element subset 556n. The element subsets 556 include a root and one or more elements that are accessible from the root. The root of an element subset 556 serves as an entry point for the one or more elements of the element subset 556. In one example, as shown in FIG. 5B, element subset 556a includes root 1 that serves as an entry point for object 1A and object 1N that are accessible from root 1.

As further shown in FIG. 5B, the element loading schedule 504 includes locations 558 of the elements 554 identified in the element loading schedule 504. The locations 558 may identify memory blocks, where the elements are loaded and/or where source data for the elements are located. In one example, the locations are memory addresses, such as explicit addresses or offsets from a base address. The location 558 of an element may indicate whether the element has been loaded on the background data area 514 and/or whether the element has been loaded and/or mapped on the runtime data area 516 (FIG. 5A). Additionally, or alternatively, the location 558 may indicate that the element has yet to be loaded from the source data area 512 (FIG. 5A). The locations 558 may utilize different naming conventions and/or different network addresses for the source data area 512, the background data area 514, and/or the runtime data area 516. In one example, as shown in FIG. 5B, locations 558 of elements that have yet to be loaded from the source data area 512 (FIG. 5A) are identified by a suffix "_s." For example, as shown in FIG. 5B, the elements in element subset 556n have yet to be loaded from the source data area 512. Additionally, or alternatively, locations 558 of elements that are loaded on the background data area 514 (FIG. 5A) are identified by a suffix "_b" and elements that are loaded on the runtime data area 516 (FIG. 5A) are identified by a suffix "_r." For example, as shown in FIG. 5B with respect to element subset 556a, object 1A is loaded on the background data area 514, and object 1N is loaded on the runtime data area 516.

The element loading schedule 504 includes an indication of an element subset 556, from the set of elements 554, that is currently being loaded on the background data area 514. In one example, the element loading schedule 504 includes an element loading window 560 that identifies an element subset 556 that is currently being loaded on the background data area 514 (FIG. 5A). As shown in FIG. 5B, the element loading window 560 indicates that element subset 556b is currently being loaded on the background data area 514 (FIG. 5A). In one example, background data thread 522a (FIG. 5A) is loading element subset 556b on the background data area 514 (FIG. 5A). A lock is applied to the elements that are currently being loaded on the background data area 514 (FIG. 5A). The lock prevents multiple threads from concurrently accessing the same elements. The element loading window 560 indicates that element subset 556b is subject to the lock. Additionally, or alternatively, the indices 550 corresponding to elements that are subject to the lock may be modified to indicate that the elements are subject to the lock. For example, as shown in FIG. 5B, the indices 550 corresponding to elements subset 556b are annotated with the suffix "x" to indicate that elements subset 556b is subject to the lock.

In one example, the element loading schedule 504 includes GC references 562 that conform to a reference configuration for a GC process that is selected for performing memory management operations. The GC process may be selected by the GC selection module 532 (FIG. 5A). The GC references 562 may be generated and added to the element loading schedule 504 in response to a trigger for commencing execution of the GC process. Additionally, or alternatively, the GC references 562 may be added to the element loading schedule 504 after at least a portion of the set of elements 554 identified in the element loading schedule 504 has been loaded on the background data area 514 and/or on the runtime data area 516 (FIG. 5A). In one example, the locations 558 are replaced with GC references 562 in response to the trigger for commencing execution of the GC process. Additionally, or alternatively, the locations 558 may be retained in the element loading schedule 504, and the GC references 562 may represent additional data in the element loading schedule 504.

In one example, the element loading schedule 504 includes links 564 that identify elements that are linked to one another. In one example, the links 564 include memory addresses. In one example, the links 564 include references that conform to the reference configuration for a GC process. In one example, the links 564 with memory addresses are replaced with references that conform to the reference configuration for the GC process, for example, in response to the trigger for commencing execution of the GC process. In one example, the element loading schedule 504 includes element identifiers 552 that identify elements 524 (FIG. 5A) that include links 564 together with element identifiers 552 that identify elements 524 that do not include links 564. Additionally, or alternatively, the element loading schedule 504 may include one or more element subsets 556 that include one or more links 564 together with one or more element subsets 556 that do not include links 564. For example, as shown in FIG. 5B, element subset 556a and element subset 556b include one or more links 564, and element subset 556c and element subset 556n do not include links 564.

5. Example Operations Pertaining to Loading Elements in a Computing Environment Referring now to FIGS. 6A-6E, operations 600 pertaining to loading elements in a computing environment are further described. One or more operations 600 described with reference to FIGS. 6A-6E may be executed using one or more components of the computing architecture described with reference to FIGS. 1-4, 5A, and/or 5B. One or more operations 600 described with reference to FIGS. 6A-6E may be modified, combined, rearranged, or omitted. Accordingly, the particular sequence of operations 600 described with reference to FIGS. 6A-6E should not be construed as limiting the scope of one or more embodiments.

Figure 6A:
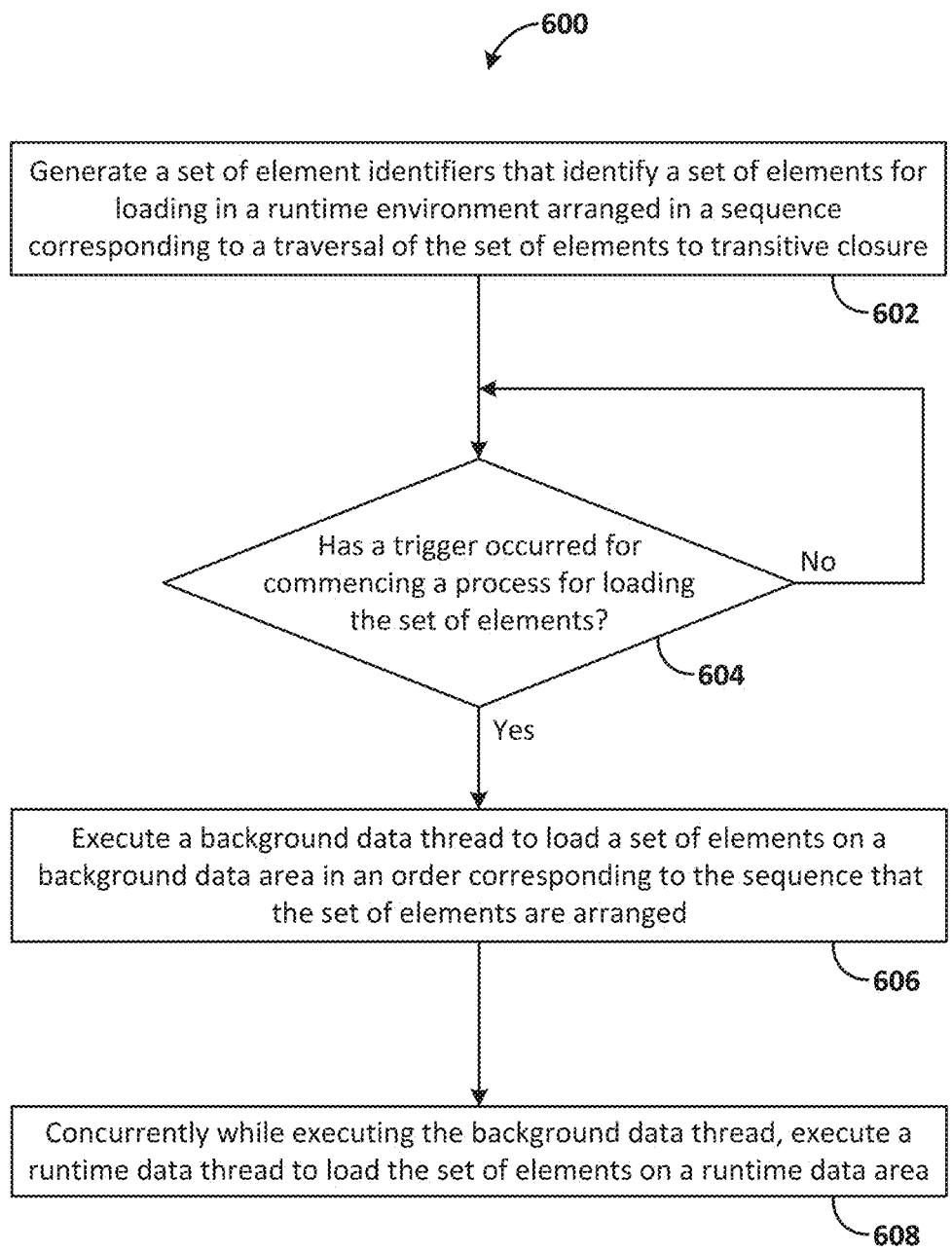
FIG. 6A is a flowchart that depicts example operations pertaining to loading elements in a computing environment according to one or more embodiments.

Referring to FIG. 6A, a system executes a background data thread to load elements on a background data area concurrently while executing a runtime data thread. The runtime data thread maps elements from the background data area to a runtime data area and/or loads elements dynamically on the runtime data area concurrently while the background data thread is loading elements on the background data area. As shown in FIG. 6A, the system generates a set of element identifiers that identify a set of elements for loading in a runtime environment (Operation 602). The element identifiers are arranged in a sequence corresponding to a traversal of the set of elements to transitive closure. The system may generate the set of element identifiers by traversing the set of elements to transitive closure. The system may traverse the elements using a traversal algorithm that achieves transitive closure. The system assigns a set of element identifiers to the set of elements. In one example, the traversal algorithm utilized to traverse the elements to transitive closure may be the same traversal algorithm utilized by a GC process in memory management operations.

The element identifiers may be index values that increment sequentially in order of traversal. Additionally, or alternatively, the system may associate index values with element identifiers that identify the set of elements. Furthermore, the system may map the element identifiers and/or the index values to the locations of the elements. The system may initially map the element identifiers and/or the index values to the locations of the elements in a source data area. Additionally, or alternatively, the system may map the element identifiers and/or the index values to the locations of the elements on the background data area and/or on the runtime data area as the elements are loaded. The system generates an element loading schedule that includes the element identifiers and/or the index values and mappings between the locations of the elements and the element identifiers and/or the index values. The system may generate the element loading schedule in the form of one or more data structures. The one or more data structures may include one or more of the following: a table, an array, a string, a graph, a stream, or an object.

The system determines whether a trigger has occurred for commencing a process for loading the set of elements (Operation 604). In one example, the trigger is an instruction associated with initializing a virtual machine. In one example, the trigger is an instruction associated with launching an application. In one example, the trigger includes determining that CDS is activated. Additionally, or alternatively, the trigger may include starting a virtual machine when CDS is activated. When the system determines that the trigger has occurred for commencing the process for loading the set of elements, the system executes a background data thread to load the set of elements on a background data area in an order corresponding to the sequence that the set of elements are arranged (Operation 606). Concurrently while executing the background data thread, the system executes a runtime data thread to load the set of elements on a runtime data area (Operation 608). The system may concurrently execute multiple background data threads. Additionally, or alternatively, the system may concurrently execute multiple runtime data threads. In one example, background data threads lack access to modify the runtime data area. Additionally, or alternatively, runtime data threads lack access to modify the background data area.

In one example, the system commences execution of one or more runtime data threads in response to determining that a background loading parameter associated with loading elements to the background data area meets a threshold value. The background loading parameter may indicate a level of utilization of the background data area and/or an allocation rate for the background data area. The level of utilization may indicate a proportion (e.g., a percentage) or an absolute value (e.g., a number of bits) of the background data area that is occupied by elements. The allocation rate may indicate a rate of allocating memory for elements on the background data area.

Figure 6B:
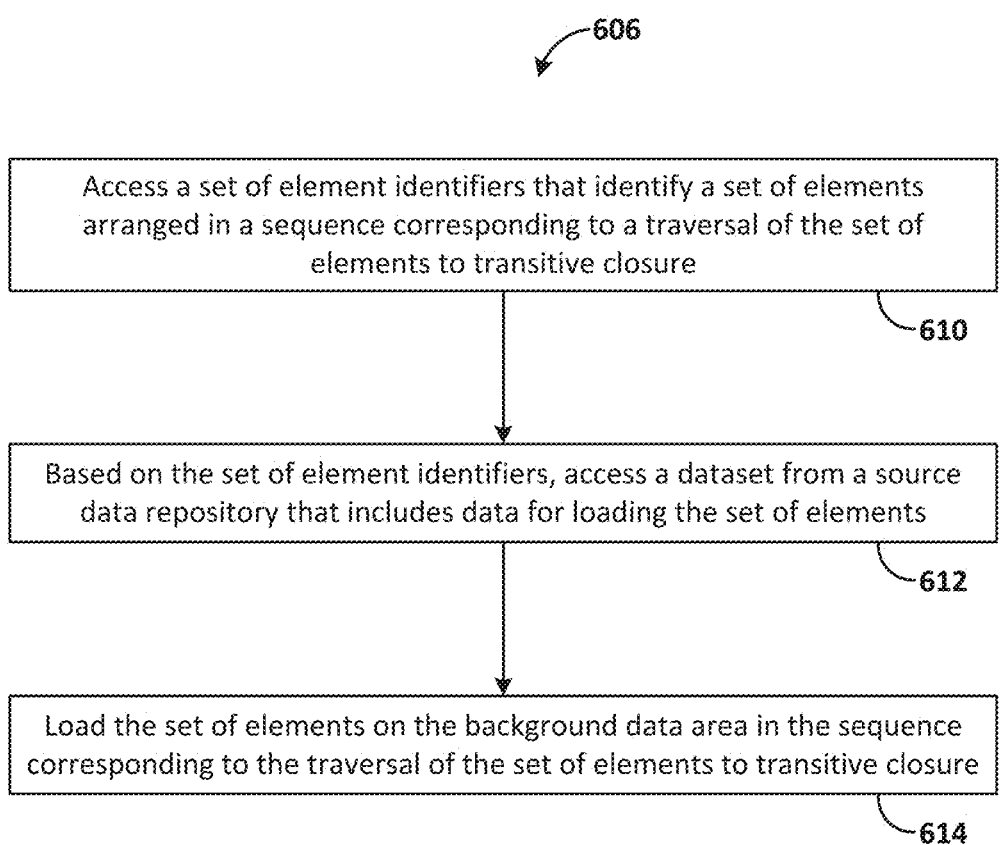
FIGS. 6B and 6C are flowcharts that depict example operations pertaining to executing background data threads to load elements on a background data area of a computing environment according to one or more embodiments.

Operations 600 pertaining to executing one or more background data threads to load elements on the background data area are further described with reference to FIGS. 6B and 6C. Operations 600 pertaining to executing one or more runtime data threads to map elements from the background data area to the runtime data area and/or to dynamically load elements on the runtime data area are further described with reference to FIGS. 6D and 6E.

The trigger for commencing the process for loading the set of elements may include an instruction to commence loading the set of elements in a runtime environment such as on the runtime data area. Additionally, or alternatively, the trigger may include an instruction to commence loading the set of elements on a background data area. In one example, the trigger is an instruction to commence an initialization process for initializing a virtual machine. In one example, the trigger is an instruction to commence an initialization process for initializing an application that is executed in the runtime environment. The trigger may include executing a startup command, for example, for initializing the virtual machine and/or an application executed in the runtime environment. Additionally, or alternatively, the trigger may include reading a configuration file, for example, for initializing the virtual machine and/or an application executed in the runtime environment. Additionally, or alternatively, the trigger may include initiating a startup process, for example, for initializing the virtual machine and/or an application executed in the runtime environment. Additionally, or alternatively, the trigger may include accessing an entry point, such as a "main" method of a class, that triggers the process for loading the set of elements. Additionally, or alternatively, the trigger may include an occurrence of an event scheduler that triggers the process for loading the set of elements. Additionally, or alternatively, the trigger may include an indication from an event listener that monitors for an occurrence of an event that triggers the process for loading the set of elements.

5.1. Executing Background Data Threads to Load Elements on a Background Data Area Referring to FIGS. 6B and 6C, operations pertaining to executing background data threads to load elements on a background data area are further described. One or more operations described with reference to FIGS. 6B and 6C may be included in operation 606 described with reference to FIG. 6A. As described with reference to FIG. 6B, the system may identify elements in a source data area based on element identifiers and load the elements on the background data area from a source data area. As shown in FIG. 6B, the system accesses a set of element identifiers that identify a set of elements to be loaded on a background data area (Operation 610). The elements are in an element loading schedule. The elements in the element loading schedule are arranged in a sequence corresponding to a traversal of the set of elements to transitive closure. Based on the set of element identifiers, the system accesses a dataset in a source data area that includes data for loading the set of elements (Operation 612). The element loading schedule includes element identifiers that are mapped to the locations in the source data area where the data for loading the set of elements is located. The locations in the source data area may be represented as memory addresses, such as explicit addresses or offsets from a base address. Upon having accessed the dataset that includes the data for loading the set of elements, the system loads the set of elements on the background data area in the sequence corresponding to the traversal of the set of elements to transitive closure (Operation 614).

In one example, the system accesses a dataset for loading elements based on element identifiers, such as index values, that identify the elements in the element loading schedule. The system may identify an element identifier corresponding to a root that represents an entry point for accessing a set of elements. The system may determine, based on the element loading schedule, that the set of elements has yet to be loaded on the background data area. The system may identify a set of mappings between a set of element identifiers corresponding to the set of elements and a set of locations where the dataset is stored on the source data area. Based on the locations, the system accesses the data for loading the set of elements. The system loads the set of elements on the background data area in a sequential order of the element identifiers and/or index values. In one example, the system determines that the elements have yet to be loaded on the background data area based on the elements being mapped to the locations on the source data area. In one example, the system replaces the locations on the source data area with locations on the background data area as elements are loaded on the background data area.

Operations pertaining to loading the set of elements on the background data area in the sequence corresponding to the traversal of the set of elements to transitive closure are further described with reference to FIG. 6C. One or more operations described with reference to FIG. 6C may be included in operation 614 described with reference to FIG. 6B. As described with reference to FIG. 6C, the system propagates a lock that represents a range of elements that a background data thread is currently loading on the background data area. The system propagates the lock incrementally through the set of elements as subsets of elements are loaded on the background data area. In one example, the system propagates the lock incrementally through the element loading schedule. The lock represents a range of index values corresponding to elements that are currently being loaded on the background data area. The lock prevents runtime data threads from accessing the range of elements that the background data thread is currently loading on the background data area. Additionally, as described with reference to FIG. 6C, the system executes an iterative traversal process to load elements on the background data area. To execute the iterative traversal process, the system allocates memory for a set of elements and then, after allocating memory for the set of elements, the system initializes the set of elements and generates references that define links between elements that are linked to one another. In one example, the operations described with reference to FIG. 6C are performed by one or more background data threads, for example, when the system executes one or more background data threads to load elements on the background data area.

Figure 6C:
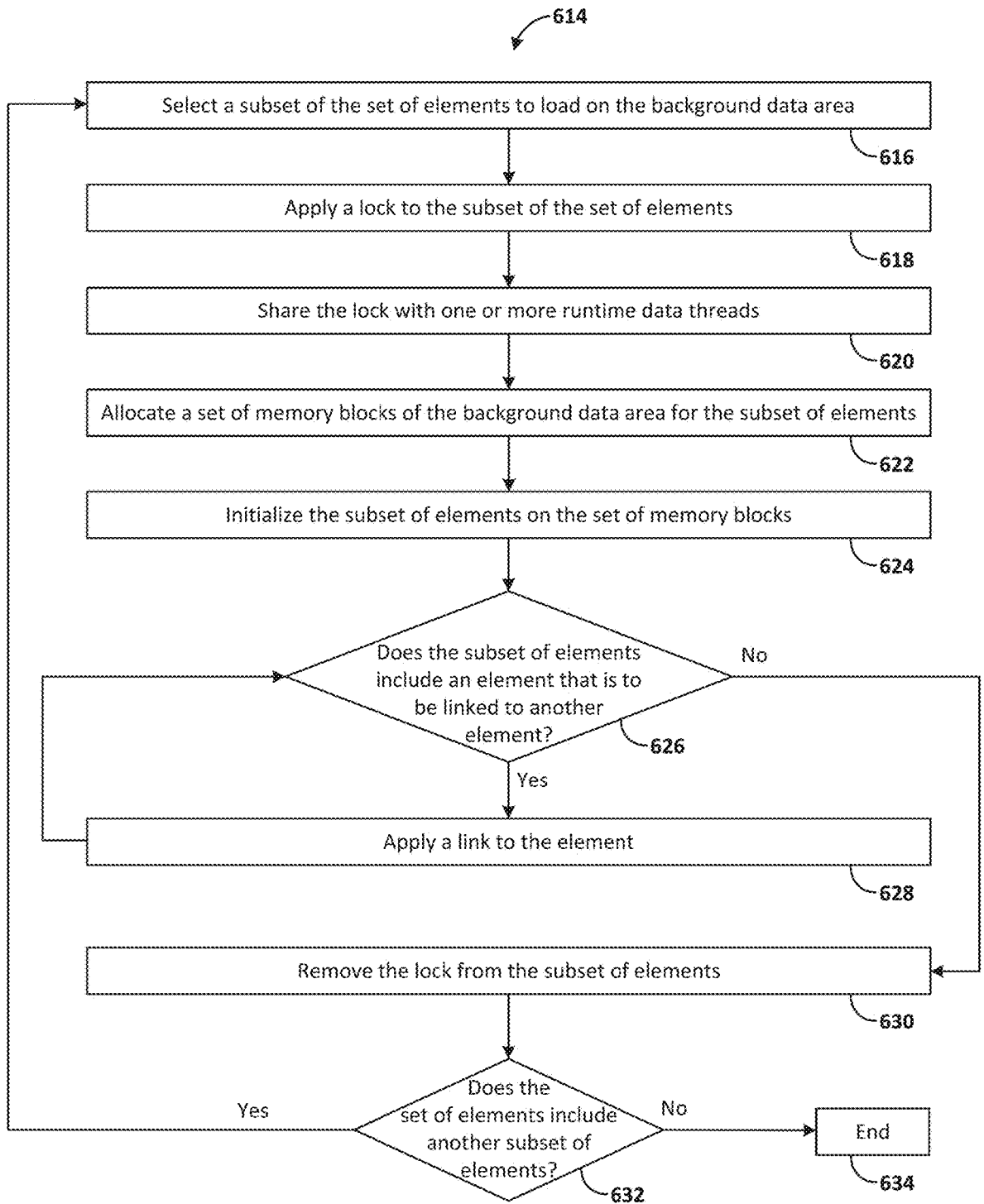

As shown in FIG. 6C, to load a set of elements on the background data area, the system selects a subset of elements from the set of elements (Operation 616). The subset of elements represents elements that are currently selected to be loaded on the background data area. The subset of elements corresponds to a root that represents an entry point to the subset of elements. The subset of elements comprehensively includes elements that are directly or indirectly reachable from the root by a traversal of the subset of elements to transitive closure. The set of elements includes multiple subsets of elements. The subset of elements selected by the system represents one of the multiple subsets of elements. The system may select additional subsets of elements in sequence as selected subsets of elements are loaded on the background data area.

Upon selecting a subset of elements to load on the background data area, the system applies a lock to the subset of the set of elements (Operation 618). The lock ensures that other threads, such as runtime data threads, cannot access the subset of elements while they are being loaded on the background data area. In one example, the system utilizes a synchronization mechanism that ensures that the subset of elements is loaded once even if multiple threads make concurrent requests. For example, the synchronization mechanism may be incorporated into a class loader mechanism that is managed by the system. The subset of elements may include one or more classes. The system may apply a lock, for example, using the synchronization mechanism, to the one or more classes in the subset of elements. Additionally, or alternatively, the system may apply a lock using a "synchronized" block or method or a "lock" object. The system may utilize the synchronized block or method to lock the entire subset of elements. For example, the system may utilize the synchronized block or method to lock a method for loading the subset of elements. Additionally, or alternatively, the system may utilize multiple synchronized blocks or methods to lock various portions of the subset of elements. Additionally, or alternatively, the system may apply lock objects to particular elements of the subset of elements. In one example, the system applies a lock object to the root that represents an entry point to the subset of elements.

In one example, the system applies a lock to the element loading schedule. The system may apply the lock to a portion of the element loading schedule that includes element identifiers that identify the subset of elements. The lock indicates that a background data thread is currently loading the subset of elements on the background data area. The system may apply the lock to the element loading schedule by adding one or more lock indicators to indicate that the subset of elements corresponding to the one or more lock indicators are locked. The application of the lock to the element loading schedule allows other threads to determine that the subset of elements is locked by referencing the element loading schedule. Other threads may determine that the subset of elements is locked by attempting to acquire a lock to the elements. By applying the lock to the element loading schedule, the system allows other threads to determine that the subset of elements is locked without the other threads attempting to acquire a lock to the elements.

Upon having applied the lock to the subset of elements, the system shares the lock with one or more runtime data threads (Operation 620). In one example, the system implicitly shares the lock with the one or more runtime data threads. For example, when a background data thread enters a synchronized block or method to load the subset of elements, the background data thread acquires an intrinsic lock. If a runtime data thread attempts to enter the synchronized block or method, the thread is blocked until the lock is released. Additionally, or alternatively, the system may implicitly share the lock with the one or more runtime data threads by adding one or more lock indicators to the element loading schedule to indicate that the subset of elements is locked.

In one example, when the system applies the one or more lock indicators to the subset of elements in the element loading schedule, the system need not retain a lock on the subset of elements themselves. When a runtime data thread accesses the element loading schedule, the runtime data thread can determine that the subset of elements is locked based on the one or more lock indicators. The runtime data thread refrains from attempting to load elements to the runtime data area that are subject to the lock. The runtime data thread may load and/or map other elements to the runtime data area that are separate from the elements that are subject to the lock. Thus, the system may release a lock applied to the subset of elements once the system has applied the one or more lock indicators to the subset of elements in the element loading schedule. In one example, the system may apply a lock to the subset of elements (e.g., via a synchronized block or method and/or via one or more lock objects). Upon applying the lock to the subset of elements, the system may apply one or more lock indicators to the subset of elements in the element loading schedule. Upon applying the one or more lock indicators to the subset of elements in the element loading schedule, the system may release the lock applied to the subset of element (e.g., via the synchronized block or method and/or via one or more lock objects). With the one or more lock indicators applied to the element loading schedule, the system may proceed to load the subset of elements to the background data area without requiring a lock on the elements themselves because the one or more lock indicators in the element loading schedule remains in place to indicate that the subset of elements are being loaded to the background data area. The critical section of bytecode impacted by the lock is reduced considerably by utilizing one or more lock indicators in the element loading schedule to indicate that the elements are being loaded to the background data area instead of retaining a lock on the elements themselves and/or by releasing the lock applied to the elements themselves upon applying the one or more lock indicator to the element loading schedule.

After applying the lock to the subset of elements and/or after applying the one or more lock indicators to the element loading schedule, the system executes an iterative traversal process to load the subset of elements on the background data area. To execute the iterative traversal process, the system allocates a set of memory blocks of the background data area for the subset of elements (Operation 622). The system allocates the set of memory blocks of the background data area for the subset of elements in the sequence that the elements are arranged in the element loading schedule. The sequence that the elements are arranged in the element loading schedule corresponds to the sequence that the elements were traversed when executing the traversal algorithm to traverse the subset of elements to transitive closure. After allocating the set of memory blocks of the background data area for the subset of elements, the system initializes the subset of elements on the set of memory blocks (Operation 624). The system initializes the subset of elements in the sequence that the elements are arranged in the element loading schedule.

In one example, to allocate a memory block of the background data area for an element of the subset of elements, the system determines a size of the element as well as selects and reserves a memory block of the background data area corresponding to the size of the element. The system may execute an algorithm, such as a bump-the-pointer algorithm, that increments to adjacent memory blocks of the background data area as memory blocks are allocated to elements. In one example, to initialize an element on a memory block that has been allocated for the element, the system loads the element from a source data area onto the memory block. The system compiles bytecode based on data in the source data area and stores the bytecode on memory blocks of the background data area. Additionally, or alternatively, the system generates metadata based on data in the source data area and stores the metadata on memory blocks of the background data area. The system may parse source data in the source data area, such as CSV lines, JSON objects, XML documents, or binary data. The system may convert the source data into a format that can be utilized to initialize the element. Additionally, the system may set default values and/or an initial state of the element.

When initializing the elements, the system applies links to elements that are linked to other elements. The system links the elements in the sequence corresponding to the traversal of elements to transitive closure in the element loading schedule. In one example, the system applies a link to an element when the element is being initialized. Additionally, or alternatively, the system may initialize the subset of elements, and then after initializing the subset of elements, the system may apply links to elements of the subset of elements that are linked to other elements. As shown in FIG. 6C, in one example, the system determines whether the subset of elements includes an element that is to be linked to another element (Operation 626). When the system determines that the subset of elements includes an element that is to be linked to another element, the system applies a link to the element (Operation 628). To apply a link for an element that references another element, the system generates a reference field for the element and initializes the reference field by adding a location of the element being linked or referenced. The system may generate a link for an element based on a location of a memory block reserved for the element when allocating the set of memory blocks for the subset of elements. In one example, the links are memory addresses, such as explicit addresses or offsets from a base address, of the background data area. In one example, the system links elements to one another utilizing memory addresses as links prior to commencing a GC process. Additionally, or alternatively, upon commencing a GC process, the system may link elements to one another utilizing links that include a layer of abstraction that conforms to a reference configuration for the GC process.

When the subset of elements has been initialized at operation 624 and links applied as applicable at operation 628, the system determines that the subset of elements does not include another element to be linked. In one example, when the system has applied a lock to the subset of elements (e.g., via a synchronized block or method and/or via one or more lock objects), and the lock has not already been released upon having applied the one or more lock indicators to the element loading schedule, the system removes the lock from the subset of elements when the system determines that the subset of elements does not include another element to be linked (Operation 630). When the system executes a background data thread that utilizes a synchronized block or method to lock the subset of elements, for example, by locking a method or block for loading the subset of elements, the lock is automatically removed when the background data thread exits the method or block. When the system utilizes lock objects, the system releases the locks by calling an unlock instruction on the lock objects. When the system applies a lock to a portion of the element loading schedule, the system removes the lock from the portion of the element loading schedule by removing one or more lock indicators from the element loading schedule. With the one or more lock indicators removed, the element loading schedule no longer indicates that the subset of elements is locked. Ater the subset of elements is released from the lock, a runtime data thread may map the subset of elements from the background data area to the runtime data area.

Upon having removed the lock from the subset of elements, the system determines whether the set of elements includes an additional subset of elements to be loaded on the background data area (Operation 632). Additionally, or alternatively, the system may determine whether the set of elements includes an additional subset of elements to be loaded on the background data area prior to removing the lock from the previous subset of elements. When the system determines that the set of elements includes an additional subset of elements to be loaded on the background data area, the system returns to operation 616, where the system selects the additional subset of elements to load on the background data area. The operations may end when the system determines that the set of elements does not include an additional subset of elements to be loaded on the background data area (Operation 634).

5.2. Executing Runtime Data Threads to Load Elements on a Runtime Data Area

Figure 6D:
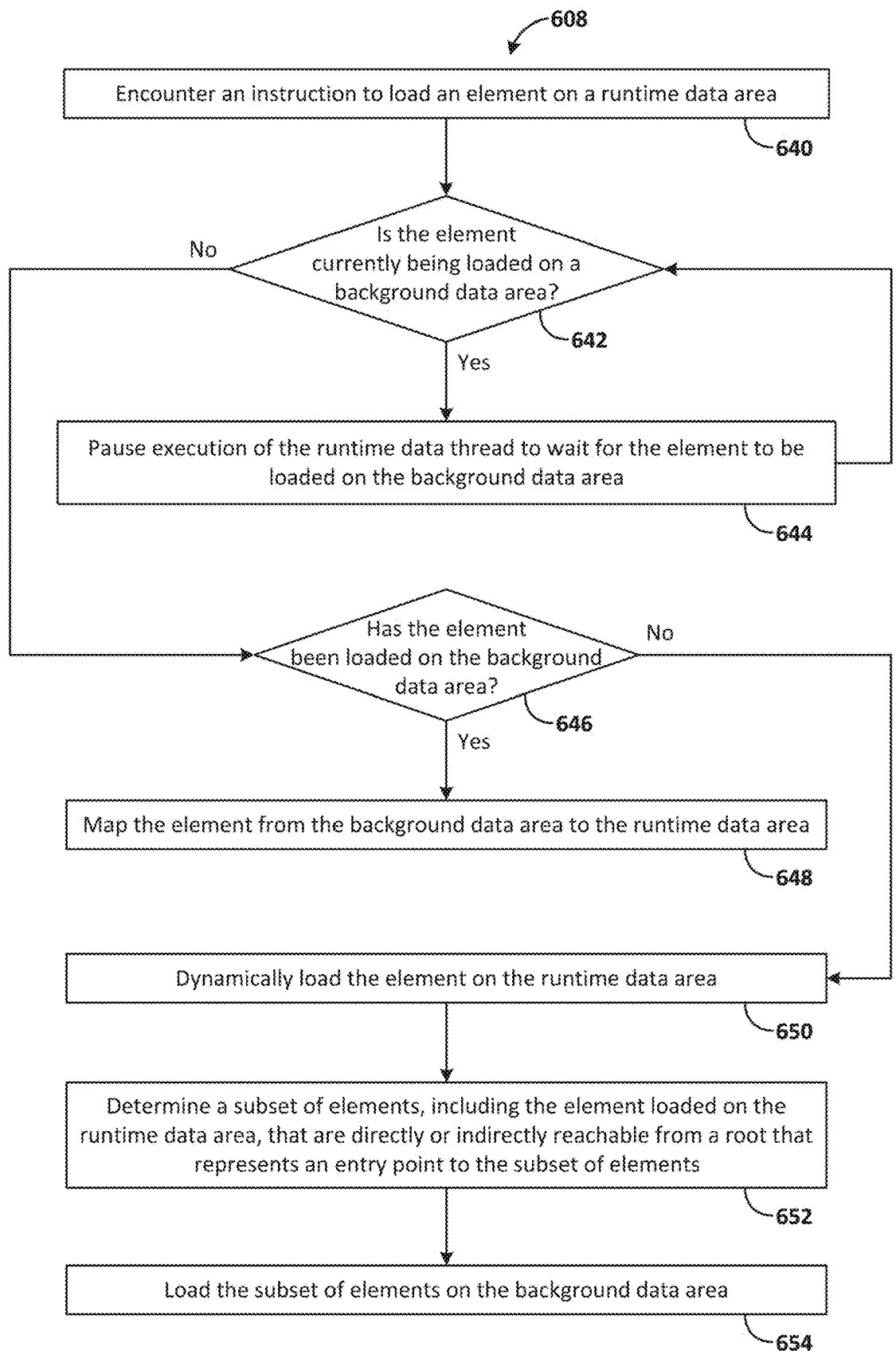
FIGS. 6D and 6E are flowcharts that depict example operations pertaining to executing runtime data threads to load elements on a runtime data area of a computing environment according to one or more embodiments.
Figure 6E:
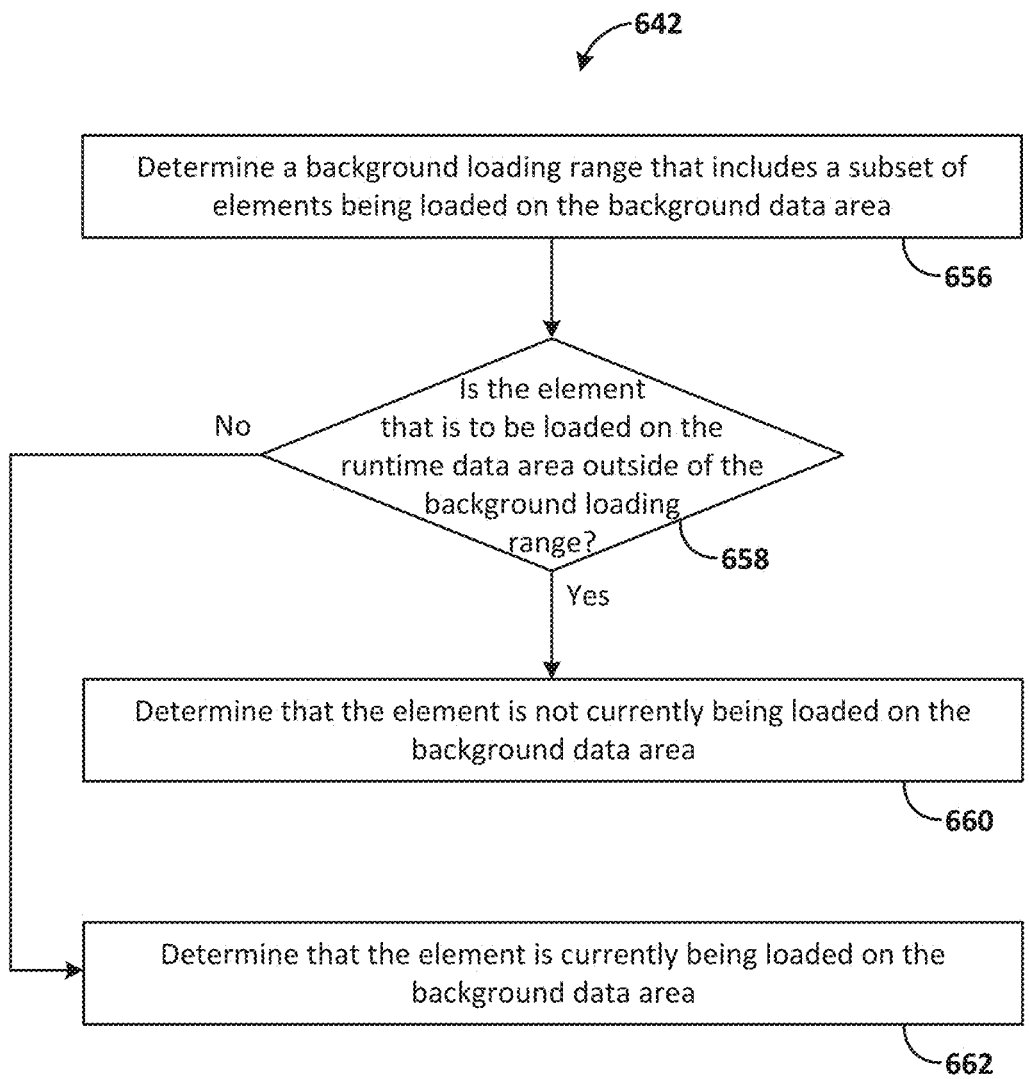

Referring to FIGS. 6D and 6E, operations pertaining to executing runtime data threads to load elements on a runtime data area are further described. One or more operations described with reference to FIGS. 6D and 6E may be included in operation 608 described with reference to FIG. 6A. As described with reference to FIG. 6D, the system may load elements on the runtime data area provided that the elements are not currently being loaded on the background data area. When the system determines that elements to be loaded on the runtime data area are currently being loaded on the background data area, the system waits for the elements to be loaded on the background data area prior to loading the elements on the runtime data area.

As shown in FIG. 6D, the system encounters an instruction to load an element on a runtime data area (Operation 640). A runtime data thread may encounter the instruction to load the element on the runtime data area. The instruction encountered by the runtime data area may include an instruction to load a particular element or multiple elements. The operations described with reference to FIG. 6D may be applied to a particular element or multiple elements. In one example, the instruction to load an element on the runtime data area is an instruction to load a root and a set of objects that are reachable from the root. The runtime data thread may load elements on the runtime data area "lazily," meaning that the runtime data thread loads elements on the runtime data area when the elements are encountered during execution of the runtime data thread. One or more runtime data threads may concurrently execute and load elements on the runtime data area, for example, when elements are encountered. In one example, the instruction to load an element on the runtime data area is an instruction to load a class or a set of classes. In one example, the instruction to load an element on the runtime data area is an instruction to load an object or a set of objects that represents an instance of a class.

When the system encounters the instruction to load the element on the runtime data area, the system determines whether the element is currently being loaded on a background data area (Operation 642). The system may determine whether the element is currently being loaded on a background data area by determining whether the element is subject to a lock. In one example, the system identifies the element in the element loading schedule that includes the set of elements arranged in the sequence corresponding to the traversal of the set of elements to transitive closure. The system may determine whether the element is currently being loaded on the background data area based on a lock indicator in the element loading schedule. When the lock indicator is applied to the element in the element loading schedule, the system determines that the element is currently being loaded on the background data area. When the element is not subject to the lock indicator, the system determines that the element is not currently being loaded on the background data area. Additionally, or alternatively, the system may determine whether the element is currently being loaded on a background data area by attempting to load the element on the runtime data area. When the element is locked by a synchronized block or method, the runtime data thread will be unable to access the synchronized block or method. Additionally, the runtime data thread will be unable to access an element that is locked by a lock object.

When the system determines that the element is currently being loaded on the background data area, the system pauses execution of the runtime data thread to wait for the element to be loaded on the background data area (Operation 644). In one example, the element is part of a subset of elements being loaded on the background data area by a background data thread. The runtime data thread waits for the background data thread to load the subset of elements on the background data area. In one example, the runtime data thread enters a waiting state for a specified time and then re-checks whether the element is still being loaded on the background data area. Additionally, or alternatively, the system may provide a notification to the runtime data thread when the element is released from the lock after having been loaded on the background data area. When the element is locked by a synchronized block or method, the runtime data thread transitions into a blocked state, and when the synchronized block or method becomes available, the runtime data thread transitions from the blocked state to an execution state.

Referring again to operation 642, when the system determines that the element is not currently being loaded on the background data area, the system selects the element and loads the element on the runtime data area. In one example, the system determines whether the element has previously been loaded on the background data area (Operation 646). In one example, the system determines whether the element has previously been loaded on the background data area based on the element loading schedule that includes the set of elements arranged in the sequence corresponding to the traversal of the set of elements to transitive closure. In one example, when an element has been loaded on the background data area, the element loading schedule includes a reference to a location of the element on the background data area. The reference to the location of the element may be a memory address, such as an explicit address or an offset from a base address, of the background data area. Additionally, or alternatively, the reference may conform to a reference configuration for a GC process. When an element has not yet been loaded on the background data area, the element loading schedule does not include a reference to a location of the element on the background data area. In one example, a reference field for indicating a location of the element includes a default value, such as a null value, when the element has not yet been loaded on the background data area. Additionally, or alternatively, when the element has not yet been loaded on the background data area, the reference field may point to a location of a dataset for loading the element from a source data area. The system may distinguish between a location of the element on the background data area and a location of a dataset for loading the element from a source data area based on one or more properties of the reference that identifies the location. For example, the system may distinguish between the background data area and the source data area based on different naming conventions and/or different network addresses associated with the background data area and the source data area.

When the system determines that the element has been loaded on the background data area, the system maps the element from the background data area to the runtime data area (Operation 648). The system may execute a memory mapping process to map the element from the background data area to the runtime data area. In one example, the system generates a reference on the runtime data area that points to the element in the background data area. To generate the reference on the runtime data area, the system allocates a memory block of the runtime data area for the reference and then initializes the reference on the memory block. Additionally, or alternatively, the system may generate a pointer on the memory block and add the reference to the pointer. The reference may include a memory address, such as an explicit address or an offset from a base address, that points to the location of the element in the background data area. Additionally, or alternatively, the reference may include a layer of abstraction that conforms to a reference configuration for a GC process.

When the system determines that the element has not been loaded on the background data area, the system dynamically loads the element on the runtime data area (Operation 650). To dynamically load the element on the runtime data area, the system determines a location of a dataset in the source data area for loading the element, allocates a memory block of the runtime data area for the element, and then initializes the element on the memory block. In one example, to allocate a memory block of the runtime data area for the element, the system determines a size of the element and selects and reserves a memory block of the runtime data area corresponding to the size of the element. The system may execute an algorithm, such as a bump-the-pointer algorithm, that increments to adjacent memory blocks of the runtime data area as memory blocks are allocated to elements. To initialize the element on a memory block that has been allocated for the element, the system loads the element from the source data area onto the memory block. The system may parse source data in the source data area, such as CSV lines, JSON objects, XML documents, or binary data. The system may convert the source data into a format that can be utilized to initialize the element. Additionally, the system may set default values and/or an initial state of the element.

When the system determines that the element has not been loaded on the background data area, upon having dynamically loaded the element in the runtime data area, the system loads the element on the background data area. The system loads the element together with a subset of elements that are directly or indirectly reachable from a root that represents an entry point to the set of elements. To load the subset of elements on the background data area, including the element loaded on the runtime data area, the system determines the subset of elements to be loaded on the background data area (Operation 652). The subset of elements comprehensively includes elements that are directly or indirectly reachable from the root by a traversal of the subset of elements to transitive closure. In one example, the system identifies the subset of elements in the element loading schedule. The element loading schedule includes the subset of elements arranged in the sequence corresponding to the traversal of the set of elements to transitive closure. In one example, the subset of elements is represented in the element loading schedule by a root and a group of elements that are reachable from the root. The system may identify the element that was loaded on the runtime data area in the element loading schedule, and then upon having identified the element that was loaded on the runtime data area, the system may identify the root that represents the entry point for the element that was loaded on the runtime data area. Upon having identified the root, the system selects the subset of elements that are directly or indirectly reachable from the root.

Upon having selected the subset of elements, the system loads the subset of elements on the background data area (Operation 654). In one example, the system utilizes a message-passing mechanism and/or a notification mechanism to instruct a background data thread to load the subset of elements on the background data area. Additionally, or alternatively, the system may utilize the message-passing mechanism and/or the notification mechanism to commence execution of a background data thread for loading the subset of elements on the background data area. In one example, the system places a task in a task queue for loading the subset of elements on the background data area, and a background data thread picks up the task from the task queue and proceeds with loading the subset of elements on the background data area.

In one example, when loading elements on the background data area based on the element loading schedule, a background thread may encounter a subset of elements that have already been loaded on the background data area in connection with lazy loading of elements on the runtime data area. When the background thread encounters a subset of elements that have already been loaded on the background data rea, the background thread identifies a next subset of elements for loading on the background data area. The next subset of elements may be arranged after the already-loaded subset of elements in the sequence corresponding to the traversal of elements to transitive closure. In one example, the system identifies an element identifier in the element loading schedule that lacks any mapping to any memory address of the background data area and selects the next subset of elements based on the element identifier lacking any mapping to any memory address of the background data area.

Referring to FIG. 6E, operations 600 pertaining to determining whether an element is currently being loaded on a background data area are further described. One or more operations described with reference to FIG. 6E may be included in operation 642 described with reference to FIG. 6D. As described with reference to FIG. 6E, the system may determine whether an element is currently being loaded on a background data area based on a background loading range that represents a subset of elements that are currently being loaded on the background data area. As shown in FIG. 6E, the system determines a background loading range that includes a subset of elements being loaded on the background data area (Operation 656).

The subset of elements covered by the background loading range comprehensively includes elements that are directly or indirectly reachable from one or more roots by a traversal of the subset of elements from the one or more roots to transitive closure. The system may determine the background loading range based on the element loading schedule that includes the elements arranged in the sequence corresponding to the traversal of the elements to transitive closure. The element loading schedule may include a lock indicator that identifies the elements that are covered by the background loading range. The lock indicator indicates that the elements identified by the lock indicator are loaded on the background data area and/or that the elements are currently being loaded on the background data area.

Upon having determined the background loading range, the system determines whether the element that is to be loaded on the runtime data area is outside of the background loading range (Operation 658). In one example, the system determines whether the element that is to be loaded on the runtime data area is outside of the background loading range by comparing an index value of the element that is to be loaded on the runtime data area to one or more index values of the background loading range.

In one example, the system determines that the element that is to be loaded on the runtime data area is outside of the background loading range when the index value of the element is less than the one or more index values of the background loading range. In one example, the system compares the index value of the element that is to be loaded on the runtime data area to the smallest index values of the background loading range and determines that the element is outside of the background loading range when the index value of the element is less than the smallest index values of the background loading range. Additionally, or alternatively, the system may compare the index value of the element that is to be loaded on the runtime data area to an index values of a root corresponding to the background loading range. The system may determine that the element is outside of the background loading range when the index value of the element is less than the index value of a root corresponding to the background loading range.

In one example, the system determines that the element that is to be loaded on the runtime data area is outside of the background loading range when the index value of the element is greater than the one or more index values of the background loading range. In one example, the system compares the index value of the element that is to be loaded on the runtime data area to the largest index values of the background loading range and determines that the element is outside of the background loading range when the index value of the element is greater than the largest index values of the background loading range.

When the system determines that the element that is to be loaded on the runtime data area is outside of the background loading range, the system determines that the subset of elements is not currently being loaded on the background data area (Operation 660). In one example, the system determines that the element that is to be loaded on the runtime data area has already been loaded on the background data area when the index value of the element is less than the index values of root corresponding to the background loading range. Additionally, or alternatively, the system may determine that the element that is to be loaded on the runtime data area has yet to be loaded on the background data area when the index value of the element is greater than the index values of root corresponding to the background loading range. When the system determines that the element that is to be loaded on the runtime data area is within the background loading range, the system determines that the element is currently being loaded on the background data area (Operation 662).

6. Example Operations Pertaining to Commencing Execution of a Garbage Collection Process Referring to FIGS. 7A and 7B, operations 700 pertaining to commencing execution of a GC process are further described. One or more operations 700 described with reference to FIGS. 7A and 7B may be executed using one or more components of the computing architecture described with reference to FIGS. 1-4, 5A, and/or 5B. One or more operations 700 described with reference to FIGS. 7A and 7B may be included in and/or combined with one or more operations 600 described with reference to FIGS. 6A-6E. Additionally, or alternatively, one or more operations 700 described with reference to FIGS. 7A and 7B may be modified, combined, rearranged, or omitted. Accordingly, the particular sequence of operations 700 described with reference to FIGS. 7A and 7B should not be construed as limiting the scope of one or more embodiments.

As described with reference to FIG. 7A, a system selects a GC process for use in the runtime environment and configures references in the runtime environment in conformance with a reference configuration for the GC process. Additionally, as described with reference to FIG. 7A, the system utilizes memory addresses as references prior to commencing the GC process. Furthermore, when the system determines a trigger for commencing the GC process, the system begins utilizing references that conform to the reference configuration for the GC process.

Figure 7A:
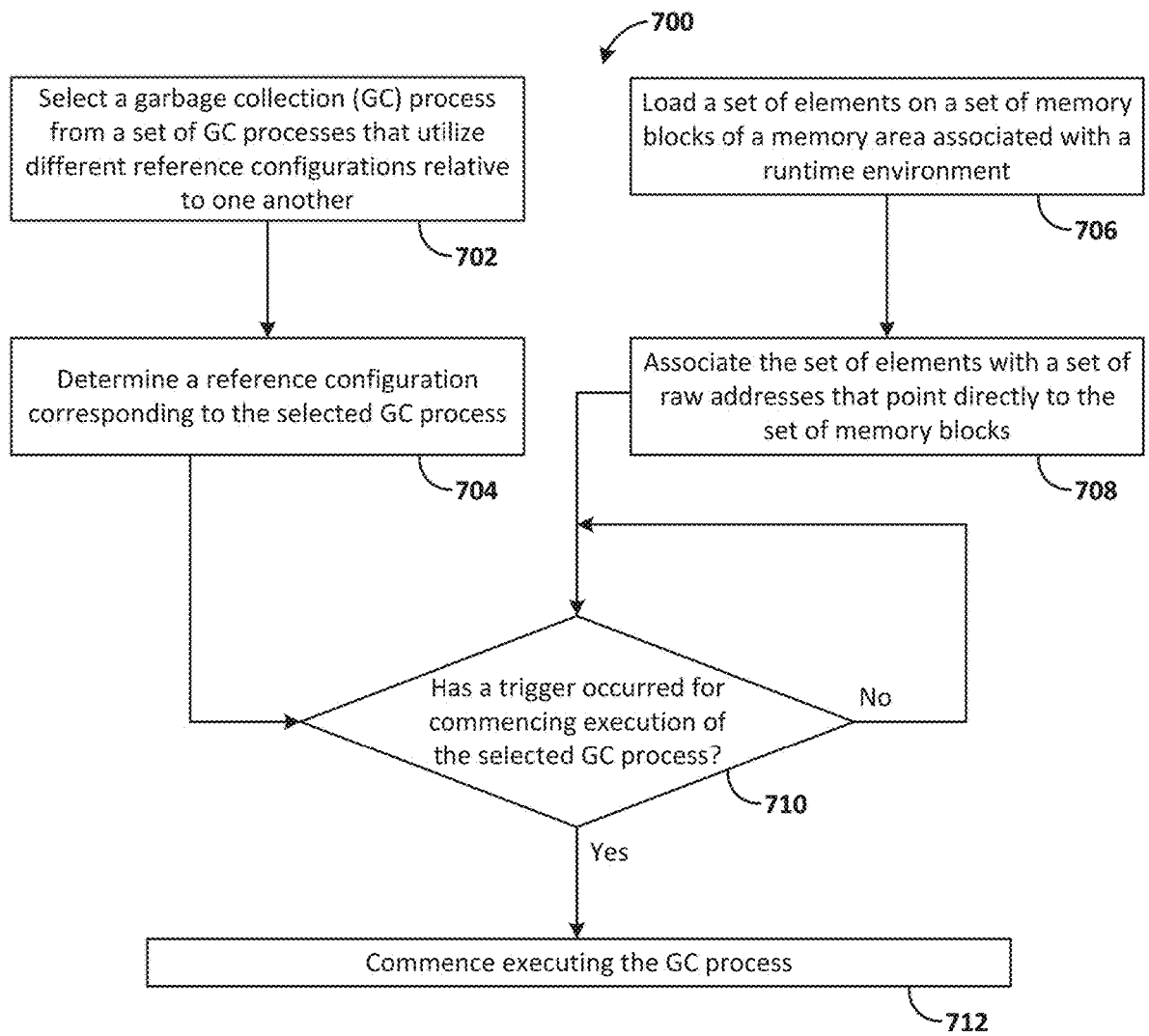
FIGS. 7A and 7B are flowcharts that depict example operations pertaining to commencing execution of a garbage collection process according to one or more embodiments.

As shown in FIG. 7A, the system selects a GC process from a set of GC processes that utilize different reference configurations relative to one another (Operation 702). The system may select the GC process by executing a command line operation for selecting the GC process. The system may select the GC process based on a system configuration and/or an input from an input device. The GC process may dynamically modify references and memory layouts in the runtime environment. In one example, the GC process includes one or more of the following: ZGC, Shenandoah GC, or G1 GC. Additionally, or alternatively, the GC process may include one or more of the following: a Serial GC, a parallel GC, or a Concurrent Mark-Sweep GC. The configuration of references for GC processes can vary significantly depending on the specific GC process that is selected.

Upon selecting a GC process, the system determines a reference configuration corresponding to the selected GC process (Operation 704). The system may determine the reference configuration corresponding to the selected GC process by accessing a configuration file corresponding to the selected GC process. Additionally, or alternatively, the system may determine the reference configuration corresponding to the selected GC process by executing command line operations corresponding to the selected GC process. The system may maintain a set of command line operations corresponding to different GC processes, and the system may execute the command line operations for the selected GC process. The system may execute one or more command line operations to select a heap size for the runtime data area, such as an initial heap size and/or a maximum heap size. Additionally, or alternatively, the system may execute command line operations to set a target maximum pause time for the selected GC process. The system may select the heap size and/or the target maximum pause time based on the selected GC process.

The set of GC processes may have their own internal data structures that include configuration information and runtime state information. The system may initialize the internal data structures corresponding to the selected GC process. The internal data structures include information for initializing reference configurations for references utilized by the GC process. The reference configuration may include a configuration for utilizing colored pointers to encode metadata directly in object references. Additionally, or alternatively, the reference configuration may include a configuration for utilizing load barriers to modify the behavior of reference load operations to handle object relocation and marking. Additionally, or alternatively, the reference configuration may include a configuration for utilizing forward pointers, such as Brooks pointers, that point to an element itself or to a new location after relocation of the element. Additionally, or alternatively, the reference configuration may include a configuration for utilizing read barriers to ensure that references to objects that are relocated are updated to the new location. Additionally, or alternatively, the reference configuration may include a configuration for utilizing write barriers to help maintain consistency during concurrent phases of the GC process. Additionally, or alternatively, the reference configuration may include a configuration for utilizing region-based pointers to point to elements within different regions of the runtime data area. Additionally, or alternatively, the reference configuration may include a configuration for utilizing concurrent marking and remarking to update references to live objects across regions. Additionally, or alternatively, the reference configuration may include a configuration for utilizing direct references without special indirection or barriers. Additionally, or alternatively, the reference configuration may include a configuration for utilizing a mark-sweep-compact process to mark live elements, reclaim memory blocks allocated for elements that were not marked, and move live objects to a contiguous memory area.

Prior to, during, or after the system selects a GC process and determines a reference configuration corresponding to the GC process, the system loads a set of elements on a set of memory blocks of a memory area associated with a runtime environment (Operation 706). The system loads the set of elements on the set of memory blocks prior to commencing execution of the GC process. The loading of the set of elements on the set of memory blocks may include loading elements on a background data area, for example, as described with reference to FIGS. 6A-6C. Additionally, or alternatively the loading of the set of elements on the set of memory blocks may include loading elements on a runtime data area, for example, as described with reference to FIG. 6A, 6D, or 6E.

When loading the set of elements, the system associates the set of elements with a set of memory addresses that point directly to the set of memory blocks (Operation 708). The memory addresses may include an explicit address or an offset from a base address. In one example, the system utilizes memory addresses in references that point to memory blocks, where various elements are loaded in the memory area. Additionally, or alternatively, the system may populate an element loading schedule with memory addresses. The system may generate mappings in the element loading schedule between element identifiers and memory addresses. The system may generate the mappings when elements are loaded on the memory area. In one example, the system utilizes memory addresses to identify locations of elements that are loaded on the background data area. In one example, the system utilizes memory addresses in references that map elements from the background data to the runtime data area. Additionally, or alternatively, the system may utilize memory addresses to identify locations of elements that are dynamically loaded on the runtime data area.

After selecting the GC process, determining the reference configuration corresponding to the GC process, loading elements on the memory blocks of the memory area, and associating the elements with memory addresses that point to the memory blocks, the system determines whether a trigger has occurred for commencing execution of the selected CC process (Operation 710). The trigger for commencing execution of the selected GC process may include a trigger based on one or more of parameters. In one example, the trigger is based on meeting a memory utilization threshold. Additionally, or alternatively, the trigger may be based on meeting an allocation rate threshold. In one example, the trigger is based on a loading parameter. The loading parameter may indicate a level of utilization of the background data area and/or an allocation rate for the background data area. Additionally, or alternatively, the loading parameter may indicate a level of utilization of the runtime data area and/or an allocation rate for the runtime data area. The level of utilization may indicate a proportion (e.g., a percentage) or an absolute value (e.g., a number of bits) of the background data area and/or the runtime data area that is occupied by elements. The allocation rate may indicate a rate of allocating memory for elements on the background data area and/or the runtime data area.

In response to determining that the trigger has occurred for commencing execution of the selected CC process, the system commences execution of the GC process (Operation 712). Execution of the GC process includes reclaiming memory blocks of the runtime data area allocated for elements that are unreachable on the runtime data area. Operations pertaining to commencing execution of the GC process are further described with reference to FIG. 7B.

Figure 7B:
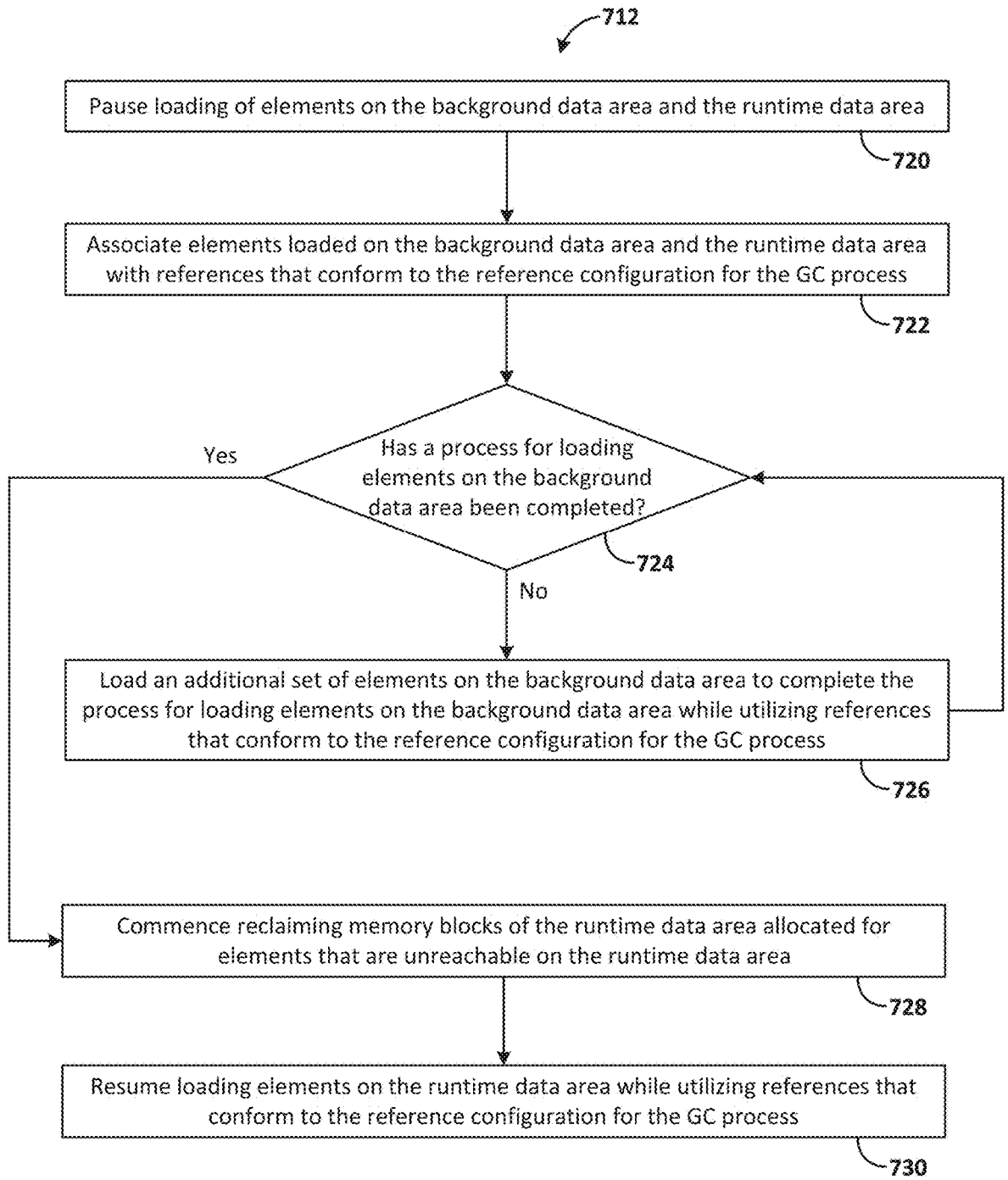

Referring to FIG. 7B, operations pertaining to commencing execution of the GC process are further described. One or more operations described with reference to FIG. 7B may be included in operation 712 described with reference to FIG. 7A. As shown in FIG. 7B, the system pauses loading of elements on the background data area and on the runtime data area (Operation 720). The system may pause loading of elements in response to determining that the trigger has occurred for commencing execution of the selected CC process. The system may pause execution of one or more threads that are loading elements on the background data area. Additionally, or alternatively, the system may pause execution of one or more threads that are loading elements on the runtime data area. In one example, the system pauses execution of the threads at a safepoint. The system pauses executing of the threads by sending a signal to the threads that instructs the threads to pause execution.

Pausing execution of the threads effectively pauses loading of elements. Upon pausing execution, the system associate elements that have been loaded with references that conform to the reference configuration for the GC process (Operation 722). The system may associate elements with references that conform to the reference configuration for the GC process by replacing existing references and/or by adding additional references. The references that conform to the reference configuration for the GC process point to memory blocks where elements are located through a layer of abstraction provided by the runtime environment. In one example, the system replaces links between elements with references that conform to the reference configuration for the GC process. Additionally, or alternatively, the system may replace memory addresses in pointers with references that conform to the reference configuration of the GC process. In one example, in accordance with the refence configuration of the GC process, the references are marked to indicate that the elements corresponding to the references are ineligible for garbage collection when the references are active. In one example, the reference configuration of the GC process includes reachability metadata for indicating whether an element is reachable or unreachable on the runtime data area.

Prior to pausing execution, the elements that are loaded on the background data area and the runtime data area are associated with references that utilize memory addresses, such as explicit addresses or offsets from a base address. In preparation for commencing execution of the GC process, the system transitions from references that utilize memory addresses to references that conform to the reference configuration for the GC process. In one example, references that utilize memory addresses are replaced in the background data area and the runtime data area with references that conform to the reference configuration for the GC process. Additionally, or alternatively, references in the element loading schedule that utilize memory addresses are replaced with references that conform to the reference configuration for the GC process. In one example, the system replaces the memory addresses in the element loading schedule with references that conform to the reference configuration for the GC process. Additionally, or alternatively, the system may generate new sets of mappings between element identifiers and references that conform to the reference configuration for the GC process.

The system may utilize the element loading schedule to identify elements for the system to associate with references that conform to the reference configuration for the GC process. The system may traverse the element loading schedule and identify references in the element loading schedule that do not conform to the reference configuration for the GC process such as references that utilize a memory address. When the system identifies an element that is associated with a reference that does not conform to the reference configuration for the GC process, the system generates a new reference that conforms with the reference configuration for the GC process and associates the element with the new reference.

Upon having associated the elements with references that conform to the reference configuration for the GC process, the system resumes execution of at least a portion of the threads and commences execution of the GC process. In one example, the system may resume loading elements on the background data area prior to commencing the GC process. As shown in FIG. 7B, the system determines whether a process for loading elements on the background data area been completed (Operation 724). In one example, the process for loading elements on the background data area is completed when a comprehensive set of elements to be loaded on the background data area has been loaded on the background data area. In one example, the process for loading elements on the background data area includes loading a set of elements identified in the element loading schedule that represents a traversal of the set of elements to transitive closure. In one example, the process for loading elements on the background data area includes loading all the elements identified in the element loading schedule. The system may determine whether the process for loading elements on the background data area is completed by determining whether the element loading schedule indicates that the comprehensive set of elements to be loaded on the background data area are loaded on the background data area.

In one example, when an element has been loaded on the background data area, the element loading schedule includes a reference to a location of the element on the background data area. Additionally, or alternatively, when an element has not yet been loaded on the background data area, the element loading schedule does not include a reference to a location of the element on the background data area. In one example, a reference field for indicating a location of the element includes a default value, such as a null value, when the element has not yet been loaded on the background data area. Additionally, or alternatively, when the element has not yet been loaded on the background data area, the reference field may point to a location of a dataset for loading the element from a source data area. The system may distinguish between a location of the element on the background data area and a location of a dataset for loading the element from a source data area based on one or more properties of the reference that identifies the location. In one example, the system may identify a reference that points to the background data area based on a naming convention for references and/or based on one or more properties of network addresses associated with the background data area.

When the system determines that the process for loading elements on the background data area is incomplete, the system loads an additional set of elements on the background data area to complete the process for loading elements on the background data area (Operation 726). The additional set of elements may represent a remainder of elements identified in the element loading schedule that have yet to be loaded on the background data area. Upon having loaded the remainder of elements on the background data area, the system may determine that the remainder of elements identified in the element loading schedule are loaded on the background data area. When loading the additional elements on the background data area, the system utilizes references that conform to the reference configuration for the GC process for identifying the elements and for links between elements. In one example, the system utilizes the reference configuration that conforms to the GC process for references that point to various elements that are loaded on background data area. Additionally, or alternatively, the system may populate an element loading schedule with references that conform to the reference configuration for the GC process. The system may generate mappings in the element loading schedule between element identifiers and references that conform to the reference configuration for the GC process. The system may generate the mappings when the additional elements are loaded on the background data area.

When the system determines that the process for loading elements on the background data area is complete, the system commences reclaiming memory blocks of the runtime data area allocated for elements that are unreachable on the runtime data area (Operation 728). In one example, the system commences reclaiming memory blocks of the runtime data area in response to determining that the remainder of elements are loading on the background data area.

In one example, the system reclaims memory blocks by marking live elements and relocating them to new memory regions to avoid fragmentation and reclaiming memory allocated for elements that are unmarked. In one example, the GC process includes a marking phase. The system executes the marking phase to identify a set of reachable elements on the runtime data area. During the marking phase, the system identifies and marks reachable elements as being reachable on the runtime data area. In one example, the GC process may include a relocation phase. During the relocation phase, the system relocates the reachable elements on the runtime data area. The system may relocate the reachable elements to consolidate the elements to a contiguous portion of the runtime data area. Additionally, during the relocation phase, the system updates references to replace pointers that point to previous memory blocks to point to current memory blocks. In one example, the GC process includes a cleanup phase. During the cleanup phase, the system reclaims memory blocks of the runtime data area that were allocated for elements that are unreachable on the runtime data area. The system executes the GC process concurrently while executing one or more runtime data threads to load elements on the runtime data area. When the GC process determines that an element and/or a reference to an element is unreachable on the runtime data area, the GC process reclaims one or more memory blocks allocated for the element.

In one example, the system determines that elements are unreachable in the runtime environment based on reachability metadata and reclaims memory blocks allocated for the elements that are unreachable. The system may identify a reference to an element and a reachability metadata entry for the reference. Based on a reachability metadata entry, the system may determine the element is unreachable. In response to determining that the element is unreachable, the system reclaims a memory block allocated for the element.

Before, during, or after commencing execution of the GC process, the system resumes loading elements on the runtime data area, utilizing references that conform to the reference configuration for the GC process (Operation 730). In one example, the system resumes loading elements on the runtime data area upon having determined that the process for loading elements on the background data area is complete. Additionally, or alternatively, the system resumes loading elements on the runtime data area after loading a remainder of elements on the background data area at operation 726. In one example, the system resumes loading elements on the runtime data area in response to determining that the remainder of elements are loading on the background data area.

The system may execute the GC process concurrently while executing one or more runtime data threads to load elements on the runtime data area. Additionally, or alternatively, the system may execute the GC process concurrently while executing one or more background data threads. In one example, after determining that the process for loading elements on the background data area is complete, the system commences an additional process for loading elements on the background data area. The system may execute the additional process for loading elements on the background data area concurrently with the GC process.

7. Example Operations Pertaining to Initializing a Virtual Machine

Figure 8:
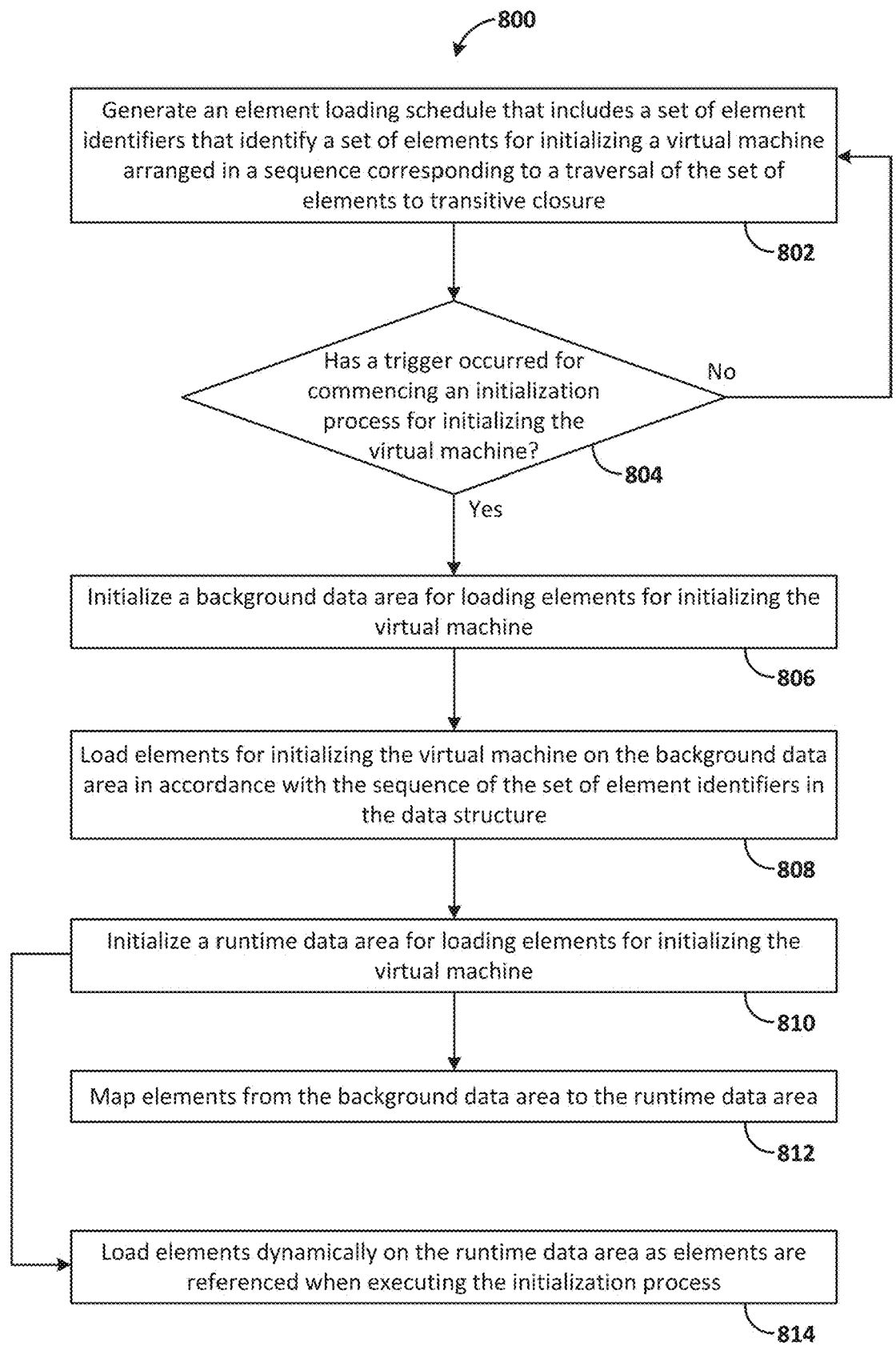
FIG. 8 is a flowchart that depicts example operations pertaining to initializing a virtual machine in accordance with one or more embodiments.
Figure 9:
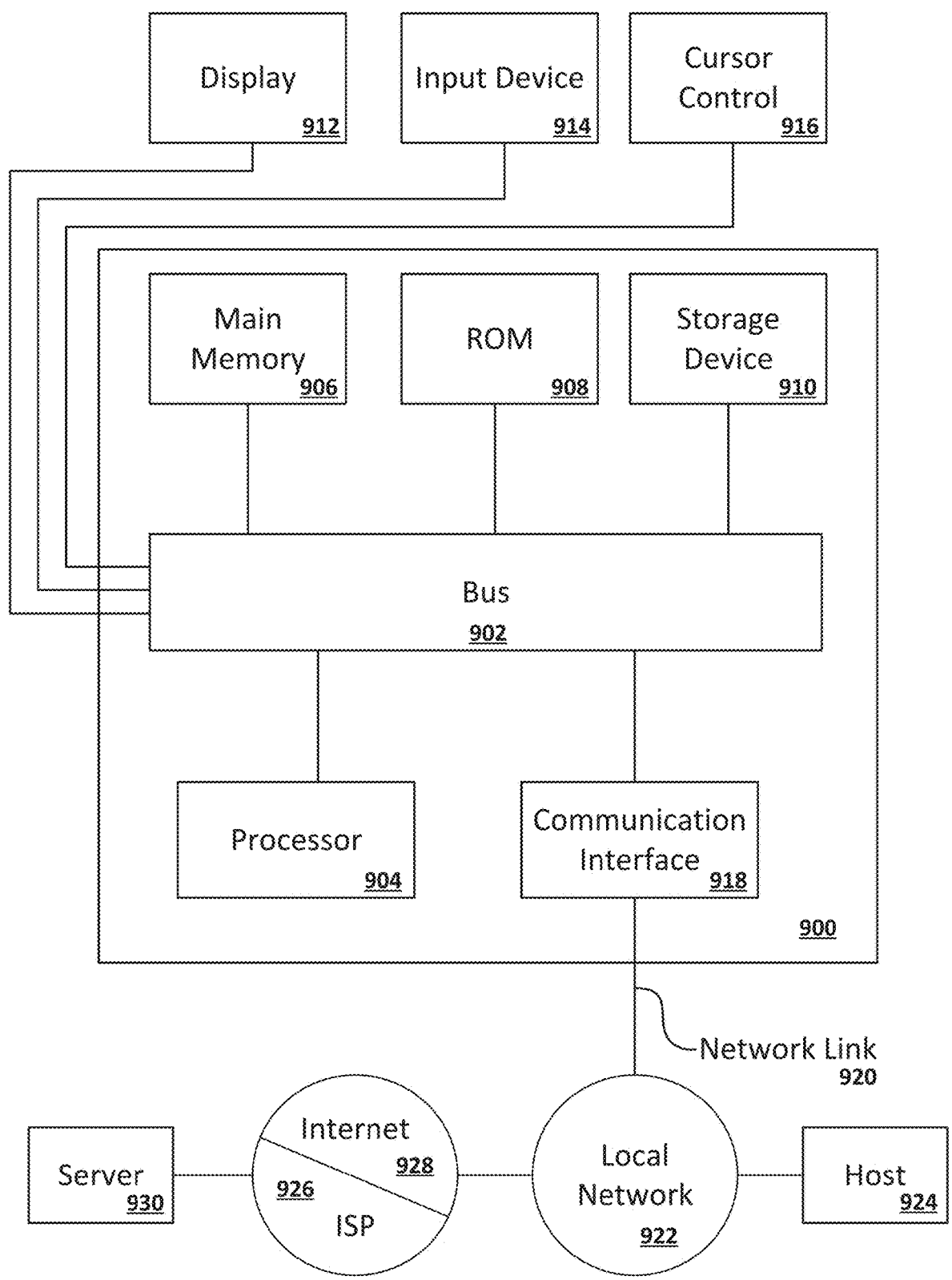
FIG. 9 is a block diagram that illustrates further example features of a computer system in accordance with one or more embodiments.

Referring now to FIG. 8, operations 800 pertaining to initializing a virtual machine are further described. One or more operations 800 described with reference to FIG. 8 may be executed using one or more components of the computing architecture described with reference to FIGS. 1-4, 5A, and/or 5B. One or more operations 800 described with reference to FIG. 8 may be included in and/or combined with one or more operations 600 described with reference to FIGS. 6A-6E and/or with one or more operations 700 described with reference to FIGS. 7A and 7B. Additionally, or alternatively, one or more operations 700 described with reference to FIG. 8 may be modified, combined, rearranged, or omitted. Accordingly, the particular sequence of operations 800 described with reference to FIG. 8 should not be construed as limiting the scope of one or more embodiments.

As shown in FIG. 8, the system executes a process for initializing a virtual machine that includes loading elements on a background data area and a runtime data area based on an element loading schedule that identifies a set of elements for initializing the virtual machine arranged in a sequence corresponding to a traversal of the set of elements to transitive closure. In one example, the system generates the element loading schedule for use in the process for initializing the virtual machine (Operation 802). To generate the element loading schedule, the system may traverse an element graph to transitive closure to identify the set of elements. Upon identifying the set of elements, the system may add element identifiers to the element loading schedule that identify the elements in the sequence corresponding to the traversal of the element graph to transitive closure. In one example, the system accesses an element loading schedule that was prepared in advance for use in the process for initializing the virtual machine. The element loading schedule may be configured as a reference table that includes a set of element identifiers that identify the set of elements for initializing the virtual machine arranged in the sequence corresponding to the traversal of the set of elements to transitive closure.

The system determines if a trigger has occurred for commencing an initialization process for initializing the virtual machine (Operation 804). The trigger for commencing the initialization process may include a scheduled task or cron job that triggers the initialization process at a specific time or time interval and/or upon occurrence of a specific event. Additionally, or alternatively, the trigger for commencing the initialization process may include meeting a load balancing threshold associated with existing resources. Additionally, or alternatively, the trigger for commencing the initialization process may include meeting a resource utilization threshold associated with a resource utilization policy. The load balancing threshold and/or the resource utilization threshold may trigger initialization of an additional virtual machine. Additionally, or alternatively, the trigger for commencing the initialization process may include a notification of an infrastructure change. The system may execute the initialization process for initializing the virtual machine to implement the infrastructure change. Additionally, or alternatively, the trigger for commencing the initialization process may include a notification of an update from a deployment process. Additionally, or alternatively, the trigger for commencing the initialization process may include starting an application. For example, starting a Java application may trigger the initialization process for initializing a JVM. Additionally, or alternatively, the system may receive an initialization request from within a runtime environment or application server that controls initialization of virtual machine instances.

The system commences the initialization process for initializing the virtual machine upon determining that the trigger has occurred for commencing the initialization process. In one example, as part of the initialization process, the system initializes a background data area for loading elements for initializing the virtual machine (Operation 806).

Upon having initialized the background data area, the system loads elements for initializing the virtual machine on the background data area in accordance with the sequence of the set of element identifiers in the element loading schedule (Operation 808). The system may load elements for initializing the virtual machine on the background data area in accordance with one or more of the operations described with reference to FIGS. 6A-6C. Additionally, or alternatively, as part of the initialization process, the system initializes a runtime data area for loading elements for initializing the virtual machine (Operation 810). Upon having initialized the runtime data area, the system maps elements from the background data area to the runtime data area (Operation 812). Additionally, or alternatively, the system loads elements dynamically on the runtime data area as elements are referenced when executing the initialization process (Operation 814). The system may map and/or load elements for initializing the virtual machine on the runtime data area in accordance with one or more of the operations described with reference to FIG. 6A, 6D, or 6E. In one example, the initialization process includes one or more operations pertaining to commencing execution of a GC process as described with reference to FIG. 7A or 7B.

In one example, to execute the initialization process for the virtual machine, the system maps a first subset of elements from the background data area to the runtime data area. Additionally, concurrently while mapping the first subset of elements from the background data area to the runtime data area, the system loads a second subset of elements on the background data area in accordance with the sequence of the set of element identifiers in the element loading schedule. Additionally, after loading the second subset of elements on the background data area, the system maps the second subset of elements from the background data area to the runtime data area. In one example, the system maps a class loader from the background data area to the runtime data area concurrently while the system loads a class path on the background data area. Additionally, or alternatively, the system may map the class loader and/or the class path from the background data area to the runtime data area concurrently while the system loads one or more of the following on the background data area: a set of static variables for use by the virtual machine, a set of system-level resources for use by the virtual machine, or an initial configuration for use by the virtual machine.

In one example, the initialization process for the virtual machine includes initializing a GC process. To initialize the GC process, the system loads a set of elements on the background data area that include data structures for executing the GC process concurrently while mapping elements for initializing the virtual machine from the background data area to the runtime data area. In one example, the elements for initializing the virtual machine include one or more of the following: a thread scheduler for managing threads; a foreign function interface for interacting with native code written in a foreign programming language; a security manager for enforcing security policies; or a startup method for initializing execution of a runtime environment. Additionally, the system maps the data structures for executing the GC process from the background data area to the runtime data area. Additionally, or alternatively, to execute the initialization process for the virtual machine the system, the system loads an additional set of elements on the background data area concurrently while mapping the data structures for executing the GC process from the background data area to the runtime data area. Additionally, subsequent to loading the additional set of elements on the background data area, the system maps the additional set of elements from the background data area to the runtime data area. In one example, the additional set of elements includes one or more of the following: a thread scheduler for managing threads; a foreign function interface for interacting with native code written in a foreign programming language; a security manager for enforcing security policies; or a startup method for initializing execution of a runtime environment.

8. Hardware Overview

According to one embodiment, the techniques described herein are implemented by one or more special-purpose computing devices. The special-purpose computing devices may be hard-wired to perform the techniques, or they may include digital electronic devices, such as one or more application-specific integrated circuits (ASICs), field programmable gate arrays (FPGAs), or network processing units (NPUs) that are persistently programmed to perform the techniques. Additionally, the special-purpose computing devices may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

For example, FIG. 8 is a block diagram that illustrates a computer system 900 that may be utilized to implement at least one embodiment of the present disclosure. Computer system 900 may include a bus 902 or other communication mechanism for communicating information and a hardware processor 904 coupled with bus 902 for processing information. Hardware processor 904 may be, for example, a general-purpose microprocessor.

Computer system 900 also may include a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 may further include a read-only memory (ROM) 908 or other static storage device couped to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allow the device to specify positions in a plane.

Computer system 900 may implement the techniques described herein using customized hard-wired logic, one or more ASICs or FPGAs, firmware, and/or program logic that, in combination with the computer system, cause or program computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media may include, for example, optical or magnetic disks, such as storage device 910. Volatile media may include dynamic memory such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), or ternary content-addressable memory (TCAM).

Storage media is distinct from but may be used in conjunction with transmission media. Transmission media participates in transferring information between storage media. For example, transmission media may include coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906. Processor 904 retrieves the data from main memory 906 and executes the instructions. The instructions received from main memory 906 may optionally be stored on storage device 910 either before or after execution by processor 904.

Computer system 900 also may include a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world-wide packet data communication network now commonly referred to as the "Internet" 928. Local network 922 and Internet 928 both use electrical, electromagnetic, or optical signals that carry digital data streams. Example forms of transmission media include the signals through the various networks, the signals through network link 920, and the signals through communication interface 918.

Computer system 900 can send messages and receive data, including program code, through the network(s), network link 920, and communication interface 918. In the Internet example, a server 930 might transmit a requested code for an application program through Internet 928, ISP 926, local network 922, and communication interface 918. The received code may be executed by processor 904 as it is received and/or stored in storage device 910 or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form that such claims issue, including any subsequent correction.

What is claimed is:

1. A method, comprising:
   determining a trigger for loading a first set of elements on a background data area;
   responsive to determining the trigger for loading the first set of elements on the background data area, executing a first thread to load the first set of elements on the background data area, wherein executing the first thread comprises:
   accessing a first set of element identifiers that identify the first set of elements arranged in a sequence corresponding to a traversal of the first set of elements to transitive closure;

based on the first set of element identifiers, accessing on a source data area, a first dataset comprising data for loading the first set of elements;

loading the first set of elements on the background data area in the sequence corresponding to the traversal of the first set of elements to transitive closure;

wherein the background data area is accessible by a second thread that maps the first set of elements from the background data area to a runtime data area;

wherein the method is performed by at least one device including a hardware processor.

2. The method of claim 1, wherein the first set of elements comprises a first set of objects that are reachable from a first root.

3. The method of claim 1, wherein the trigger for loading the first set of elements to the background data area comprises: an instruction associated with launching an application.

4. The method of claim 1, wherein accessing, based on the first set of element identifiers, the first dataset comprising data for loading the first set of elements comprises:

identifying a first element identifier, of the first set of element identifiers, corresponding to a first root that represents an entry point to the first set of elements;

determining that the first set of elements have yet to be loaded on the background data area;

identifying a set of mappings between the first set of element identifiers and a set of locations where the first dataset is stored on the source data area;

accessing the first dataset on the source data area based on the set of locations.

5. The method of claim 4, wherein determining that the first set of elements have yet to be loaded on the background data area comprises:

determining that the first set of elements are mapped to the set of locations on the source data area.

6. The method of claim 1, wherein accessing the first set of element identifiers comprises:

accessing an element loading schedule comprising a first set of mappings between a first set of index values and the first set of element identifiers, wherein the first set of index values are arranged according to the sequence corresponding to the traversal of the first set of elements to transitive closure; and identifying the first set of element identifiers in the element loading schedule.

7. The method of claim 6, wherein loading the first set of elements on the background data area in the sequence corresponding to the traversal of the first set of elements to transitive closure comprises:

loading the first set of elements on the background data area in a sequential order of the first set of index values.

8. The method of claim 6, wherein executing the first thread further comprises:

populating the element loading schedule with a first set of addresses of a first set of memory blocks of the background data area allocated for the first set of elements, wherein the first set of addresses are mapped to the first set of index values;

determining a trigger for commencing a garbage collection process;

responsive to determining the trigger for commencing the garbage collection process:

applying a first lock to the first set of elements;

replacing the first set of addresses with a first set of references, wherein the first set of references are marked to indicate that the first set of elements corresponding to the first set of references are ineligible for garbage collection when the first set of references are active.

9. The method of claim 6, wherein executing the first thread further comprises:

determining that a loading parameter of the background data area meets a threshold value; and responsive to determining that the loading parameter meets the threshold value:

pausing loading elements on the background data area, and while loading elements on the background data area is paused: commencing a garbage collection process for reclaiming memory blocks from at least one of: the background data area or the runtime data area;

subsequent to commencing the garbage collection process:

resuming loading elements on the background data area, wherein resuming loading elements on the background data area comprises:

loading a second set of elements on the background data area, wherein the second set of elements represents a remainder of elements identified in the element loading schedule.

10. The method of claim 9, further comprising:

concurrently while executing the first thread, executing the second thread to map elements from the background data area to the runtime data area;

responsive to determining that the loading parameter meets the threshold value:

pausing execution of the second thread, determining that the remainder of elements identified in the element loading schedule are loaded on the background data area, and responsive to determining that the remainder of elements are loading on the background data area: resuming execution of the second thread.

11. The method of claim 10, wherein executing the first thread to load the first set of elements on the background data area comprises:

propagating a lock incrementally through the first set of elements, wherein the lock represents a range of elements that are currently being loaded on the background data area.

12. The method of claim 6, further comprising:

prior to executing the first thread: generating the first set of element identifiers in the element loading schedule at least by:

executing the traversal on an element graph comprising the first set of elements, continuing the traversal to transitive closure, and adding the first set of element identifiers to the element loading schedule arranged in the sequence corresponding to the traversal of the first set of elements to transitive closure.

13. The method of claim 1, wherein loading the first set of elements on the background data area in the sequence corresponding to the traversal of the first set of elements to transitive closure comprises:

allocating a first set of memory blocks of the background data area for the first set of elements in the sequence corresponding to the traversal of the first set of elements to transitive closure;
subsequent to allocating the first set of elements on the background data area: initializing the first set of elements on the first set of memory blocks in the sequence corresponding to the traversal of the first set of elements to transitive closure.

14. The method of claim 13, wherein initializing the first set of elements comprises at least one of:
generating metadata based on the first dataset and storing the metadata on at least a portion of the first set of memory blocks; or
compiling bytecode based on the first dataset and storing the bytecode on at least a portion of the first set of memory blocks.

15. The method of claim 14, wherein loading the first set of elements further comprises:
linking a first subset of elements, of the first set of elements, to a second subset of elements, of the first set of elements, in the sequence corresponding to the traversal of the first set of elements to transitive closure.

16. The method of claim 15, wherein loading the first set of elements further comprises:
loading a first element, of the first set of elements, at least by:
initializing the first element;
identifying a first field of the first element that references a second element, of the first set of elements;
determining a first address of a first memory block allocated for the second element;
populating the first field with the first address of the first memory block; and
subsequent to loading the first element, loading the second element, at least by:
initializing the second element;
identifying a second field of the second element that references a third element;
determining a second address of a second memory block allocated for the third element;
populating the second field with the second address of the second memory block.

17. The method of claim 13, wherein allocating the first set of elements comprises:
populating an element loading schedule with a first set of addresses of the first set of memory blocks allocated for the first set of elements, wherein the first set of addresses are mapped to a first set of index values in the element loading schedule representing the first set of elements.

18. The method of claim 17, wherein executing the first thread to load the first set of elements on the background data area comprises:
propagating a lock incrementally through the element loading schedule, wherein the lock represents a range of index values, comprising at least a portion of the first set of index values, corresponding to elements that are currently being loaded on the background data area.

19. The method of claim 18, wherein executing the first thread to load the first set of elements on the background data area comprises:
determining the first set of index values;
applying a first lock to the first set of index values prior to loading the first set of elements on the background data area; and
sharing the first lock with the second thread, wherein the second thread loads a second set of elements to the runtime data area that are separate from the first set of elements while the first lock is applied to the first set of index values.

20. The method of claim 19,
wherein the second thread determines that the first lock is applied to the first set of index values; and
wherein responsive to determining that the first lock is applied to the first set of index values, the second thread refrains from attempting to load any of the first set of elements to the runtime data area.

21. The method of claim 19, further comprising:
further executing the first thread to load the second set of elements on the background data area, wherein further executing the first thread comprises:
subsequent to loading the first set of elements on the background data area:
determining a second set of index values representing the second set of elements in the element loading schedule,
applying a second lock to the second set of index values prior to loading the second set of elements on the background data area,
sharing the second lock with the second thread, wherein the second thread loads a third set of elements to the runtime data area that are separate from the second set of elements while the second lock is applied to the second set of index values,
releasing the first set of index values from the first lock;
subsequent to applying the second lock to the second set of index values:
loading the second set of elements on the background data area.

22. The method of claim 21, wherein subsequent to releasing the first set of index values from the first lock, the second thread maps the first set of elements from the background data area to the runtime data area.

23. The method of claim 21, wherein loading the second set of elements comprises:
identifying a first object, of the second set of elements, that references a second object, of the first set of elements;
linking the first object to the second object.

24. The method of claim 1, further comprising:
concurrently while executing the first thread, executing a third thread to load a second set of elements on the background data area.

25. One or more non-transitory computer-readable media comprising instructions that, when executed by one or more hardware processors, cause performance of operations comprising:
determining a trigger for loading a first set of elements on a background data area;
responsive to determining the trigger for loading the first set of elements on the background data area, executing a first thread to load the first set of elements on the background data area, wherein executing the first thread comprises:
accessing a first set of element identifiers that identify the first set of elements arranged in a sequence corresponding to a traversal of the first set of elements to transitive closure;
based on the first set of element identifiers, accessing on a source data area, a first dataset comprising data for loading the first set of elements;

loading the first set of elements on the background data area in the sequence corresponding to the traversal of the first set of elements to transitive closure;

wherein the background data area is accessible by a second thread that maps the first set of elements from the background data area to a runtime data area.

26. A system comprising:

at least one device including a hardware processor;

the system being configured to perform operations comprising:

determining a trigger for loading a first set of elements on a background data area;

responsive to determining the trigger for loading the first set of elements on the background data area, executing a first thread to load the first set of elements on the background data area, wherein executing the first thread comprises:

accessing a first set of element identifiers that identify the first set of elements arranged in a sequence corresponding to a traversal of the first set of elements to transitive closure;

based on the first set of element identifiers, accessing on a source data area, a first dataset comprising data for loading the first set of elements;

loading the first set of elements on the background data area in the sequence corresponding to the traversal of the first set of elements to transitive closure;

wherein the background data area is accessible by a second thread that maps the first set of elements from the background data area to a runtime data area.

\* \* \* \* \*